(12) United States Patent
Matsuda et al.

(10) Patent No.: US 7,557,160 B2
(45) Date of Patent: Jul. 7, 2009

(54) IMPACT-RESISTANT VINYL AROMATIC HYDROCARBON RESIN

(75) Inventors: Takaaki Matsuda, Kanagawa (JP); Toshinori Shiraki, Kanagawa (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 39 days.

(21) Appl. No.: 11/661,182

(22) PCT Filed: Aug. 31, 2004

(86) PCT No.: PCT/JP2004/012510

§ 371 (c)(1),
(2), (4) Date: Feb. 26, 2007

(87) PCT Pub. No.: WO2006/025098

PCT Pub. Date: Mar. 9, 2006

(65) Prior Publication Data

US 2007/0260017 A1    Nov. 8, 2007

(51) Int. Cl.
*C08L 53/02* (2006.01)
*C08L 51/04* (2006.01)

(52) U.S. Cl. .............................. 525/88; 525/93; 525/94; 525/99

(58) Field of Classification Search ................... 525/88, 525/93, 94, 99
See application file for complete search history.

(56) References Cited

U.S. PATENT DOCUMENTS

| | | | |
|---|---|---|---|
| 3,903,201 A | 9/1975 | Childers et al. | |
| 4,914,248 A | 4/1990 | Kitagawa et al. | |
| 7,005,469 B2 | 2/2006 | Fusamae et al. | |
| 7,256,238 B2 * | 8/2007 | Kubo et al. | 525/88 |
| 2003/0119966 A1 | 6/2003 | Fusamae et al. | |

FOREIGN PATENT DOCUMENTS

| | | |
|---|---|---|
| EP | 1 275 660 | 1/2003 |
| GB | 1 514 005 | 6/1978 |
| JP | 6-345833 | 12/1994 |
| JP | 11-130824 | 5/1999 |
| JP | 2003-313255 | 11/2003 |
| WO | WO03008466 * | 1/2003 |
| WO | 2003-085010 | 10/2003 |
| WO | 2004/072136 | 8/2004 |

* cited by examiner

*Primary Examiner*—Jeffrey C Mullis
(74) *Attorney, Agent, or Firm*—Staas & Halsey LLP

(57) ABSTRACT

An impact-resistant vinyl aromatic hydrocarbon resin, the hydrocarbon resin being produced by radical polymerization of 75 to 98 parts by mass of a vinyl aromatic hydrocarbon monomer (A-1) or a mixture of a vinyl aromatic hydrocarbon monomer and a monomer copolymerizable therewith (A-2) and 2 to 25 parts by mass of a modified block copolymer (B), wherein the component (B) comprises a base block copolymer (B-1) comprising conjugated diene monomer units and vinyl aromatic hydrocarbon monomer units and containing at least one polymer block of vinyl aromatic hydrocarbon monomer units (H), and a modifier group bonded thereto (B-2); and the component (B) has the following characteristics: (i) the content of the vinyl aromatic hydrocarbon monomer units is 12 to 50 mass %; (ii) the content of the polymer block (H) is 12 to 45 mass %; and (iii) the polymer block ratio (the mass % of the polymer block (H) based on the total mass of vinyl aromatic hydrocarbon monomer units contained in (B)) is more than 50 mass %.

7 Claims, No Drawings

IMPACT-RESISTANT VINYL AROMATIC HYDROCARBON RESIN

CROSS REFERENCE TO RELATED APPLICATIONS

This application is based on PCT International Application No. PCT/JP2004/012510 filed Aug. 31, 2004, the disclosures of which are hereby incorporated herein by reference.

TECHNICAL FIELD

The present invention relates to an impact-resistant vinyl aromatic hydrocarbon resin. More specifically, the present invention relates to an impact-resistant vinyl aromatic hydrocarbon resin, the hydrocarbon resin being produced by radical polymerization of 75 to 98 parts by mass of a vinyl aromatic hydrocarbon monomer (A-1) or a mixture of a vinyl aromatic hydrocarbon monomer and a monomer copolymerizable therewith (A-2) and 2 to 25 parts by mass of a modified block copolymer (B), wherein the modified block copolymer (B) comprises (B-1) a base block copolymer comprising conjugated diene monomer units and vinyl aromatic hydrocarbon monomer units and containing at least one polymer block of vinyl aromatic hydrocarbon monomer units (H) and (B-2) at least one primary modifier group comprising at least one functional group, bonded to the base block copolymer; and the modified block copolymer (B) has a specific content of the vinyl aromatic hydrocarbon monomer units, a specific content of the polymer block (H), and a specific polymer block ratio (the mass % of the at least one polymer block of vinyl aromatic hydrocarbon monomer units (H) based on the total mass of vinyl aromatic hydrocarbon monomer units contained in the modified block copolymer (B)). The impact-resistant vinyl aromatic hydrocarbon resin of the present invention is excellent in the balance of impact strength, rigidity, and appearance characteristics. Particularly, the impact-resistant vinyl aromatic hydrocarbon resin of the present invention excellent in both impact strength and appearance characteristics is industrially extremely useful because a technique for sufficiently and well-balancedly improving the impact strength and appearance characteristics of an impact-resistant vinyl aromatic hydrocarbon resin has not previously been known.

BACKGROUND ART

Polystyrenes are used in a variety of applications because they are excellent in rigidity, transparency, and gloss and have good moldability. However, these polystyrenes have a major disadvantage that they are inferior in impact resistance; various unvulcanized rubbers are used as tougheners in order to reduce the disadvantage. Among others, there is industrially widely produced a styrenic resin composition in which a styrenic monomer is graft polymerized to a rubber-like polymer, obtained by radical polymerization of the styrene monomer in the presence of the unvulcanized rubber.

Among the unvulcanized rubbers used for this purpose are polybutadiene and styrene-butadiene copolymers; particularly, polybutadiene is widely used because it can confer excellent impact resistance.

In recent years, the styrenic resin composition has come to be required to have various excellent characteristics as it has applications spreading into housings and other parts for home electric appliances, axle parts, office machine parts, daily sundries, toys, and the like; a strong need exists for a styrenic resin composition excellent in the balance of appearance characteristics, rigidity, and impact resistance.

Generally, the styrenic resin composition is produced by dissolving, in a styrene monomer, polybutadiene rubber or styrene-butadiene copolymer rubber as a rubber-like polymer and performing a bulk polymerization or bulk-suspension polymerization method under stirring.

The improvement in impact resistance is generally made possible by increasing the content of the rubber-like polymer, but while a styrenic resin having the increased rubber-like polymer exhibits enhanced impact strength, it has reduced rigidity and gloss. On the other hand, the improvement in gloss is made possible by reducing the content of the rubber-like polymer or micronizing rubber-like polymer particles dispersed in the resin, but the impact resistance is markedly decreased.

Several methods for improving the impact strength of the styrenic resin composition have been previously disclosed. Examples of the disclosed methods include a method involving specifying the solution viscosity of the conjugated dienic polymer (see, for example, Japanese Patent Publication No. 58-04934), a method involving specifying the relationship between the solution viscosity and Mooney viscosity of the conjugated dienic polymer (see, for example, Japanese Patent Publication No. 53-44188), and a method involving specifying the relationship between the solution viscosity of the conjugated dienic polymer and the tensile modulus and swelling degree of an organic peroxide crosslinked product (see, for example, Japanese Patent Laid-Open No. 60-025001).

These methods improve the balance of impact resistance and gloss compared to conventional methods using polybutadiene, but the improvement has not always been satisfactory.

On the other hand, methods for improving the impact resistance and appearance characteristics using styrene-butadiene block copolymers with specific structures have been disclosed. (See, for example, Japanese Patent Laid-Open Nos. 61-143415, 63-165413, 02-132112, and 02-208312.) However, when examined in detail, these methods have not provided practically satisfactory balance of impact resistance and appearance characteristics.

There have been also disclosed a method for improving the impact strength of an impact-resistant styrenic resin using a conjugated dienic polymer modified with a nitrogen-containing compound comprising an oxygen atom in the molecule (see, for example, Japanese Patent Laid-Open No. 63-008411) and a method for improving the impact strength of an impact-resistant styrenic resin using a conjugated dienic polymer comprising a hydroxyl terminal group (see, for example, Japanese Patent Laid-Open No. 63-278920). In addition, there have been disclosed a method for improving the impact strength and gloss of an impact-resistant styrenic resin using a hydrogenated polymer modified with a hydroxyl, amino, epoxy, silanol or alkoxysilane group (see, for example, WO03/85010) and a method for improving the gloss and impact strength of a styrenic resin composition by combining a modified polymer and a silica-based inorganic filler (see, for example, Japanese Patent Laid-Open No. 2003-313255). However, when examined in detail, these methods have not provided the practically satisfactory balance of impact resistance and appearance characteristics. For example, the styrenic resin compositions obtained in the Examples of WO03/85010 and Japanese Patent Laid-Open No. 2003-313255 described above have not been satisfactory in appearance characteristics although they have improved impact resistance.

Thus, it has been difficult to sufficiently and well-balancedly improve the impact resistance, rigidity, and appearance characteristics of a conventional impact-resistant styrenic resin.

DISCLOSURE OF THE INVENTION

Under such circumstances, the present inventors have made intensive studies for developing an impact-resistant vinyl aromatic hydrocarbon resin sufficiently and well-balancedly improved in impact resistance, rigidity, and appearance characteristics. As a result, the present inventors have found that the above-described problems can be solved by an impact-resistant vinyl aromatic hydrocarbon resin, the hydrocarbon resin being produced by radical polymerization of 75 to 98 parts by mass of a vinyl aromatic hydrocarbon monomer (A-1) or a mixture of a vinyl aromatic hydrocarbon monomer and a monomer copolymerizable therewith (A-2) and 2 to 25 parts by mass of a modified block copolymer (B), wherein the modified block copolymer (B) comprises (B-1) a base block copolymer comprising conjugated diene monomer units and vinyl aromatic hydrocarbon monomer units and containing at least one polymer block of vinyl aromatic hydrocarbon monomer units (H) and (B-2) at least one primary modifier group comprising at least one functional group, bonded to the base block copolymer; and the modified block copolymer (B) has a specific content of the vinyl aromatic hydrocarbon monomer units, a specific content of the polymer block (H), and a specific polymer block ratio (the mass % of the at least one polymer block of vinyl aromatic hydrocarbon monomer units (H) based on the total mass of vinyl aromatic hydrocarbon monomer units contained in the modified block copolymer (B)). This finding has led to the accomplishment of the present invention.

Thus, one object of the present invention is to provide an impact-resistant vinyl aromatic hydrocarbon resin sufficiently and well-balancedly improved in impact resistance, rigidity, and appearance characteristics.

The above-described and other objects, features, and advantages of the present invention will become apparent from the following detailed description and claims.

DETAILED DESCRIPTION OF THE INVENTION

One aspect of the present invention provides an impact-resistant vinyl aromatic hydrocarbon resin, the hydrocarbon resin being produced by radical polymerization of 75 to 98 parts by mass of a vinyl aromatic hydrocarbon monomer (A-1) or a mixture of a vinyl aromatic hydrocarbon monomer and a monomer copolymerizable therewith (A-2) and 2 to 25 parts by mass of a modified block copolymer (B), wherein the total amount of the vinyl aromatic hydrocarbon monomer (A-1) or the mixture (A-2) and the modified block copolymer (B) is 100 parts by mass, wherein the modified block copolymer (B) comprises:

(B-1) a base block copolymer comprising conjugated diene monomer units and vinyl aromatic hydrocarbon monomer units and containing at least one polymer block of vinyl aromatic hydrocarbon monomer units (H) and (B-2) at least one primary modifier group comprising at least one functional group, bonded to the base block copolymer; and the modified block copolymer (B) has the following characteristics:

(i) the content of the vinyl aromatic hydrocarbon monomer units is 12 to 50 mass % based on the mass of the modified block copolymer (B);

(ii) the content of the at least one polymer block (H) is 12 to 45 mass % based on the mass of the modified block copolymer (B); and (iii) the polymer block ratio defined as the mass % of the at least one polymer block of vinyl aromatic hydrocarbon monomer units (H) based on the total mass of vinyl aromatic hydrocarbon monomer units contained in the modified block copolymer (B) is more than 50 mass %.

For purposes of facilitating the understanding of the present invention, the basic features and preferable aspects of the invention will now be listed.

1. An impact-resistant vinyl aromatic hydrocarbon resin, the hydrocarbon resin being produced by radical polymerization of 75 to 98 parts by mass of a vinyl aromatic hydrocarbon monomer (A-1) or a mixture of a vinyl aromatic hydrocarbon monomer and a monomer copolymerizable therewith (A-2) and 2 to 25 parts by mass of a modified block copolymer (B), wherein the total amount of the vinyl aromatic hydrocarbon monomer (A-1) or the mixture (A-2) and the modified block copolymer (B) is 100 parts by mass, wherein the modified block copolymer (B) comprises:

(B-1) a base block copolymer comprising conjugated diene monomer units and vinyl aromatic hydrocarbon monomer units and containing at least one polymer block of vinyl aromatic hydrocarbon monomer units (H) and (B-2) at least one primary modifier group comprising at least one functional group, bonded to the base block copolymer; and the modified block copolymer (B) has the following characteristics:

(i) the content of the vinyl aromatic hydrocarbon monomer units is 12 to 50 mass % based on the mass of the modified block copolymer (B);

(ii) the content of the at least one polymer block (H) is 12 to 45 mass % based on the mass of the modified block copolymer (B); and (iii) the polymer block ratio defined as the mass % of the at least one polymer block of vinyl aromatic hydrocarbon monomer units (H) based on the total mass of vinyl aromatic hydrocarbon monomer units contained in the modified block copolymer (B) is more than 50 mass %.

2. The impact-resistant vinyl aromatic hydrocarbon resin described in item 1 above, characterized in that the mixture (A-2) is a mixture of a vinyl aromatic hydrocarbon monomer and an unsaturated nitrile monomer.

3. The impact-resistant vinyl aromatic hydrocarbon resin described in item 1 or 2 above, characterized in that the or each primary modifier group comprises at least one functional group selected from the group consisting of a hydroxyl group, an epoxy group, an amino group, a silanol group, and an alkoxysilane group containing 1 to 24 carbon atoms.

4. The impact-resistant vinyl aromatic hydrocarbon resin described in any one of items 1 to 3, characterized in that the or each primary modifier group comprises at least one functional group selected from the group consisting of functional groups represented by formulas (a) to (m) below.

[Formula 1]

$$—NR^1—R^5—OH, \quad (a)$$

$$—N[R^5—OH]_2, \quad (b)$$

-continued

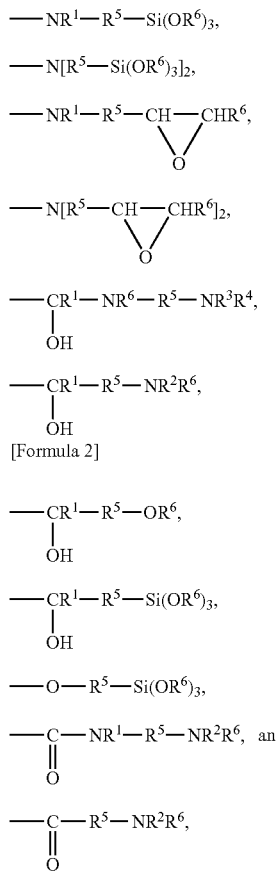

in the above formulas (a) to (m),

N represents a nitrogen atom, Si represents a silicon atom, O represents an oxygen atom, C represents a carbon atom, and H represents a hydrogen atom;

$R^1$ to $R^4$ each independently represent a hydrogen atom and a monovalent hydrocarbon group containing 1 to 24 carbon atoms, wherein the monovalent hydrocarbon group is unsubstituted or substituted by at least one functional group each independently selected from the group consisting of a hydroxyl group, an epoxy group, an amino group, a silanol group, and an alkoxysilane group containing 1 to 24 carbon atoms;

$R^5$s each independently represent a divalent hydrocarbon group containing 1 to 48 carbon atoms, wherein the divalent hydrocarbon group is unsubstituted or substituted by at least one functional group each independently selected from the group consisting of a hydroxyl group, an epoxy group, an amino group, a silanol group, and an alkoxysilane group containing 1 to 24 carbon atoms;

$R^6$s each independently represent a hydrogen atom and an alkyl group containing 1 to 8 carbon atoms;

wherein $R^1$ to $R^5$ may optionally each independently have at least one atom selected from the group consisting of an oxygen atom, a nitrogen atom, and a silicon atom, bonded in a bonding mode other than those for a hydroxyl group, an epoxy group, an amino group, a silanol group, and alkoxysilane groups.

5. The impact-resistant vinyl aromatic hydrocarbon resin described in any one of items 1 to 4 above, characterized in that the modified block copolymer (B) further comprises at least one secondary modifier group, wherein the secondary modifier group comprises at least one functional group bonded to the functional group of the primary modifier group.

6. The impact-resistant vinyl aromatic hydrocarbon resin described in term 5 above, characterized in that the or each secondary modifier group comprises at least one functional group selected from the group consisting of a hydroxyl group, an amino group, a carboxyl group, an acid anhydride group, an isocyanate group, an epoxy group, a silanol group, and an alkoxysilane group containing 1 to 24 carbon atoms.

7. The impact-resistant vinyl aromatic hydrocarbon resin described in any one of items 1 to 6 above, characterized in that 70% or less of the double bonds of the conjugated diene monomer units in the base block copolymer (B-1) is hydrogenated.

The present invention is described below in detail.

For the purpose of the present invention, the designation of each monomer unit constituting a polymer is according to the designation of a monomer from which the monomer unit is derived. By way of example, "vinyl aromatic hydrocarbon monomer unit" refers to a constituent unit of the polymer resulting from the polymerization of a vinyl aromatic hydrocarbon compound as a monomer, and the structure thereof is a molecular structure in which the two carbons of a substituted ethylene group originating from a substituted vinyl group provide bonding sites. In addition, "conjugated diene monomer unit" refers to a constituent unit of the polymer resulting from the polymerization of a conjugated diene as a monomer, and the structure thereof is a molecular structure in which the two carbons of an olefin originating from a conjugated diene monomer provide bonding sites.

The impact-resistant vinyl aromatic hydrocarbon resin of the present invention is a impact-resistant vinyl aromatic hydrocarbon resin produced by radical polymerization of 75 to 98 parts by mass of a vinyl aromatic hydrocarbon monomer (A-1) or a mixture of a vinyl aromatic hydrocarbon monomer and a monomer copolymerizable therewith (A-2) and 2 to 25 parts by mass of a modified block copolymer (B) (where the total amount of the vinyl aromatic hydrocarbon monomer (A-1) or the mixture (A-2) and the modified block copolymer (B) is 100 parts by mass).

Examples of the vinyl aromatic hydrocarbon monomer (A-1) used in the present invention include α-alkyl-substituted styrenes such as styrene, vinylnaphthalene, α-methylstyrene, α-ethylstyrene, and α-methyl-p-methylstyrene, nucleus alkyl-substituted styrenes such as m-methylstyrene, p-methylstyrene, 2,4-dimethylstyrene, ethylvinylbenzene, and p-tert-butylstyrene, halogenated styrenes such as monochlorostyrene, dichlorostyrene, tribromostyrene, and tetrabromostyrene, p-hydroxystyrene, and o-methoxystyrene; these monomers are used alone or in a mixture of two kinds or more. Preferred are styrene, α-methylstyrene, and p-methylstyrene.

According to the present invention, in the mixture of a vinyl aromatic hydrocarbon monomer and a monomer copolymerizable therewith (A-2), the vinyl aromatic hydrocarbon monomer may be selected from those described above as examples of (A-1). In addition, examples of the monomer copolymerizable with a vinyl aromatic hydrocarbon monomer include unsaturated nitrile monomers and (meth)acrylates.

Examples of the unsaturated nitrile monomer include acrylonitrile and methacrylonitrile; these monomers may be used alone or in combination. Particularly preferred is acrylonitrile.

Examples of the (meth)acrylate include methyl acrylate, ethyl acrylate, propyl acrylate, butyl acrylate, amyl acrylate, hexyl acrylate, octyl acrylate, dodecyl acrylate, cyclohexyl acrylate, methyl methacrylate, ethyl methacrylate, propyl methacrylate, butyl methacrylate, amyl methacrylate, hexyl methacrylate, octyl methacrylate, dodecyl methacrylate, and cyclohexyl methacrylate; these (meth)acrylates may be used alone or in combination. Particularly preferred is methyl methacrylate.

Examples of other copolymerizable monomers include acrylic acid, methacrylic acid, vinyl acetate, maleic anhydride, N-methylmaleimide, and N-phenylmaleimide.

The component (B) used in the present invention is a modified block copolymer comprising (B-1) a base block copolymer comprising conjugated diene monomer units and vinyl aromatic hydrocarbon monomer units and containing at least one polymer block of vinyl aromatic hydrocarbon monomer units (H) and (B-2) at least one primary modifier group comprising at least one functional group, bonded to the base block copolymer.

The modified block copolymer (B) may be a hydrogenated one as hereinafter described, or may be also a secondary modified block copolymer obtained by further reacting a secondary modifier with the modified block copolymer comprising a primary modifier group (hereinafter often referred to as "primary modified block copolymer"), as will be described below.

The content of vinyl aromatic hydrocarbon monomer units in the modified block copolymer (B) is 12 to 50 mass %, preferably 12 to 45 mass %, more preferably 12 to 35 mass %. A content of vinyl aromatic hydrocarbon monomer units of less than 12 mass % makes the appearance characteristics inferior, and more than 50 mass % reduces the impact strength.

The base block copolymer comprising conjugated diene monomer units and vinyl aromatic hydrocarbon monomer units (B-1), used in the present invention contains at least one polymer block of vinyl aromatic hydrocarbon monomer units (H). The content of the vinyl aromatic hydrocarbon polymer block (H) in the modified block copolymer (B) is 12 to 45 mass %, preferably 12 to 40 mass %, more preferably 12 to 30 mass % based on the mass of the modified block copolymer (B). In addition, the polymer block ratio defined as the mass % of the at least one polymer block of vinyl aromatic hydrocarbon monomer units (H) based on the total mass of vinyl aromatic hydrocarbon monomer units contained in the modified block copolymer (B) is more than 50 mass %, preferably 60 to 100 mass %. According to the present invention, in order to obtain an impact-resistant vinyl aromatic hydrocarbon resin excellent in the balance of impact strength and gloss, it is essential to use a modified block copolymer in which the content of the vinyl aromatic hydrocarbon polymer block (H) is in the above-described range and the polymer block ratio is in the above-described range.

In the modified block copolymer (B), vinyl aromatic hydrocarbon monomer units not forming the vinyl aromatic hydrocarbon polymer block (H) may be distributed uniformly or in tapered form in the portion of the copolymer of conjugated diene monomer units and vinyl aromatic hydrocarbon monomer units. Pluralities of portions having vinyl aromatic hydrocarbon monomer units distributed uniformly and/or in tapered form may also coexist in the modified block copolymer (B).

The determination of the content of the vinyl aromatic hydrocarbon polymer block (H) may be carried out before or after the modification of the base block copolymer (B-1).

The content of the vinyl aromatic hydrocarbon polymer block (H) is determined, for example, from the mass of the polymer block component of a vinyl aromatic hydrocarbon monomer (where that of the polymer component of a vinyl aromatic hydrocarbon monomer having a polymerization degree of 30 or less is excluded) obtained by a method (as described in I. M. KOLTHOFF, et al., J. Polym. Sci. 1, 429 (1946)) involving subjecting a modified or unmodified base block copolymer (that before hydrogenation when it is to be used after the hydrogenation) to oxidative decomposition with tertiary-butyl hydroperoxide in the presence of osmium tetroxide, as a catalyst. In addition, the above-described polymer block ratio (mass %) can be determined from the following equation.

Polymer block ratio(mass %)=(the mass of a polymer block of a vinyl aromatic hydrocarbon monomer in a modified or unmodified base block copolymer before hydrogenation/the mass of the total vinyl aromatic hydrocarbon monomer units in the modified or unmodified base block copolymer before hydrogenation)×100

According to the present invention, the modified base block copolymer (B-1) before modification and hydrogenation consisting of conjugated diene monomer units and vinyl aromatic hydrocarbon monomer units can be produced by subjecting at least one kind of conjugated monomer and at least one kind of vinyl aromatic hydrocarbon monomer to solution polymerization in the presence of an organolithium catalyst. A method for producing the base block copolymer (B-1) of the invention may adopt any production method provided that it can provide the base block copolymer (B-1) of the invention.

By way of example, it can be produced by solution polymerization in a hydrocarbon solvent using, for example, a method involving block copolymerizing a mixture of a conjugated diene monomer and a vinyl aromatic hydrocarbon monomer employing an organolithium catalyst, a method involving block copolymerizing a mixture of a conjugated diene monomer and a vinyl aromatic hydrocarbon monomer employing an organolithium catalyst and subsequently adding the vinyl aromatic hydrocarbon monomer to increase a vinyl aromatic hydrocarbon polymer block, a method involving random copolymerizing a mixture of a conjugated diene monomer and a vinyl aromatic hydrocarbon monomer employing an organolithium catalyst and subsequently adding the vinyl aromatic hydrocarbon monomer to increase a vinyl aromatic hydrocarbon polymer block, or a method involving polymerizing a conjugated diene monomer employing an organolithium catalyst and subsequently adding a vinyl aromatic hydrocarbon monomer to form a vinyl aromatic hydrocarbon polymer block.

The primary modified block copolymer according to the present invention is obtained by addition reaction of a primary modifier to be described to the living end of the base block copolymer acquired using, for example, the above-described method employing an organolithium compound as a polymerization catalyst, and has, for instance, any one of structures represented by the following general formulas.

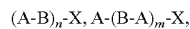(A-B)$_n$-X, A-(B-A)$_m$-X,

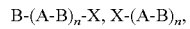B-(A-B)$_n$-X, X-(A-B)$_n$,

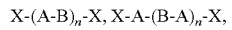X-(A-B)$_n$-X, X-A-(B-A)$_n$-X,

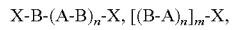X-B-(A-B)$_n$-X, [(B-A)$_n$]$_m$-X,

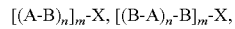[(A-B)$_n$]$_m$-X, [(B-A)$_n$-B]$_m$-X,

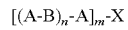[(A-B)$_n$-A]$_m$-X (wherein A is a polymer block of a vinyl aromatic hydrocarbon monomer and B is a polymer of a conjugated diene monomer and/or a copolymer block consisting of conjugated diene monomer units and vinyl aromatic hydrocarbon monomer units; n is an integer of 1 or more, preferably 1 to 5; m is an integer of 2 or more, preferably 2 to 11; X represents the residue of a modifier, to which an atomic group forming a functional group to be described is bonded, wherein X is bonded to the side chain of A and/or B when added by metalation reaction; the structures of a plurality of polymer chains bonded to X may be identical or different.). The primary modified block copolymer used in the present invention may be any mixture of polymers represented by the above general formulas.

According to the present invention, the microstructure (the ratios of cis to trans and vinyl) of the conjugated diene portion in the primary modified block copolymer may be optionally changed using a polar compound to be described or the like; when 1,3-butadiene is used as a conjugated diene monomer, the amount of 1,2-vinyl bonding is preferably 5 to 90 mol %, preferably 10 to 70 mol %, more preferably 10 to 50 mol %. When isoprene is used as a conjugated diene monomer, or when 1,3-butadiene and isoprene are employed in combination, the total amount of 1,2-vinyl bonding and 3,4-vinyl bonding is preferably 3 to 80 mol %, more preferably 5 to 70 mol %. In the microstructure when a hydrogenated product of the base block copolymer is used, however, it is recommended that the amount of 1,2-vinyl bonding be preferably 10 to 80 mol %, more preferably 15 to 75 mol %, particularly preferably 20 to 50 mol % when 1,3-butadiene is employed as a conjugated diene monomer, and the total amount of 1,2-vinyl bonding and 3,4-vinyl bonding be preferably 5 to 70 mol %, more preferably 10 to 50 mol % when isoprene is employed as a conjugated diene monomer or when 1,3-butadiene and isoprene are employed in combination. In this respect, for the purpose of the present invention, the total amount of 1,2-vinyl bonding and 3,4-vinyl bonding (however, it is the amount of 1,2-vinyl bonding when 1,3-butadiene is used as a conjugated diene) is hereinafter referred to as the amount of vinyl bonding.

According to the present invention, the amount of vinyl bonding based on a conjugated diene in the primary modified block copolymer or a hydrogenated product thereof can be known using a nuclear magnetic resonance apparatus (NMR).

According to the present invention, at least one each of portions having different amounts of vinyl bonding may be present in the primary modified block copolymer consisting of conjugated diene monomer units and vinyl aromatic hydrocarbon monomer units. For example, at least one each of portions having a vinyl bonding amount of 25 mol % or less, preferably 10 to 23 mol % and a vinyl bonding amount of more than 25 mol %, preferably 28 to 80 mol % may be present. In the above structural formulas, polymers comprising two or more block Bs may have identical or different vinyl bonding amounts of the respective block Bs.

For the purpose of the present invention, the conjugated diene monomer is a diolefin comprising a pair of conjugated double bonds, and examples thereof include 1,3-butadiene, 2-methyl-1,3-butadiene(isoprene), 2,3-dimethyl-1,3-butadiene, 1,3-pentadiene, and 1,3-hexadiene; particularly typical are 1,3-butadiene and isoprene. These monomers may be used in a combination of two kinds or more as well as alone in the production of one polymer. Examples of the vinyl aromatic hydrocarbon monomer include styrene, o-methylstyrene, p-methylstyrene, p-tert-butylstyrene, 1,3-dimethylstyrene, α-methylstyrene, vinylnaphthalene, and vinylanthracene; particularly typical is styrene. These monomers may be used in a combination of two kinds or more as well as alone in the production of one polymer.

According to the present invention, when isoprene and 1,3-butadiene are used in combination as conjugated diene monomers, the mass ratio of isoprene and 1,3-butadiene is preferably 95/5 to 5/95, more preferably 90/10 to 10/90, still more preferably 85/15 to 15/85. Particularly, to obtain a resin excellent in low-temperature characteristics, it is recommended that the mass ratio of isoprene and 1,3-butadiene be preferably 49/51 to 5/95, more preferably 45/55 to 10/90, still more preferably 40/60 to 15/85. The combined use of isoprene and 1,3-butadiene provides a resin excellent in the balance of appearance characteristics and mechanical properties even in molding at high temperature.

Among the solvents used for producing the base block copolymer (B-1) in the present invention are hydrocarbon-based solvents including aliphatic hydrocarbons such as butane, pentane, hexane, isopentane, heptane, octane, and isooctane, alicyclic hydrocarbons such as cyclopentane, methylcyclopentane, cyclohexane, methylcyclohexane, and ethylcyclohexane, and aromatic hydrocarbons such as benzene, toluene, ethylbenzene, and xylene. These solvents may be used in a combination of two kinds or more as well as alone.

For the purpose of the present invention, the organolithium compound used for producing the base block copolymer (B-1) is a monoorganolithium compound or a polyfunctional organolithium compound, or may be a mixture thereof. Examples of the monoorganolithium compound include n-butyllithium, sec-butyllithium, tert-butyllithium, n-propyllithium, iso-propyllithium, and benzyllithium; n-butyllithium and sec-butyllithium are preferably used. In addition, organoalkaline metal compounds as disclosed, for example, in U.S. Pat. No. 5,708,092, U.K. Patent No. GB2,241,239, and U.S. Pat. No. 5,527,753 may be used.

Examples of the polyfunctional organolithium compound include dilithiomethane, 1,4-dilithiobutane, 1,6-dilithiohexane, 1,4-dilithiocyclohexene, 1,4-dilithio-2-ethylcyclohexane, 1,3-dilithio-4-phenylbutane, 1,2-dilithio-1,2-diphenylethane, 1,10-dilithiodecane, 1,20-dilithioeicosane, 1,1-dilithiodiphenylene, 1,4-dilithiobenzene, 1,5-dilithionaphthalene, dilithiopolybutadiene, dilithioisoprene, dilithiodiisoprene, dilithiopolyisoprene, 2,2',2"-trilithio-p-terphenyl, 1,3,5-trilithiobenzene, and 1,3,5-trilithio-2,4,6-triethylbenzene.

In addition to the above-described compounds, a monoorganolithium compound as a mixture of a monoorganolithium compound and a polyfunctional organolithium compound may be also used. Among these examples, particularly typical is a reaction product comprising both a monoorganolithium compound and a polyvinyl aromatic hydrocarbon compound (see, for example, Japanese Patent Publication No. 43-25510). By way of specific example, a reaction product of a monoorganolithium compound and a polyvinyl aromatic hydrocarbon compound, a reaction product obtained by reacting a monoorganolithium compound with a conjugated diene monomer, followed by reacting with a polyvinyl aromatic hydrocarbon compound, a reaction product obtained by reacting a monoorganolithium compound with a monovinyl aromatic hydrocarbon compound, followed by reacting with a polyvinyl aromatic hydrocarbon compound, or a reaction product obtained by reacting a reaction product obtained by simultaneously reacting a monoorganolithium compound, a conjugated diene monomer or monovinyl aromatic hydrocarbon compound, and a polyvinyl aromatic hydrocarbon compound is used. In addition, a catalyst obtained by reacting a polyvinyl aromatic hydrocarbon compound with a reaction product of a monoorganolithium compound and a monovinyl aromatic hydrocarbon compound, followed by further reacting with a monovinyl aromatic hydrocarbon compound is also effective.

As used herein, the polyvinyl aromatic hydrocarbon compound is, for example, o-, m-, or p-divinylbenzene, o-, m-, or p-diisopropenylbenzene, 1,2,4-trivinylbenzene, 1,2-vinyl-3,4-dimethylbenzene, 1,3-divinylnaphthalene, 1,3,5-trivinylnaphthalene, 2,4-divinylbiphenyl, 3,5,4'-trivinylbiphenyl, 1,2-divinyl-3,4-dimethylbenzene, or 1,5,6-trivinyl-3,7-diethylnaphthalene, and these compounds may be used alone or in a combination of two kinds or more. Divinylbenzene is particularly preferable; divinylbenzene has o-, m-, and p-isomers, and commercial divinylbenzene as a mixture of these isomers has practically no problem. As used herein, the monovinyl aromatic hydrocarbon compound is, for example, styrene, vinyltoluene, vinylethylbenzene, vinylxylene, or vinylnaphthalene; styrene is particularly preferable.

These organolithium compounds may be used in a mixture of two kinds, or more as well as alone. In addition, the organolithium compound may be added in one or more portions midway through polymerization in producing a polymer.

According to the present invention, in producing the base block copolymer (B-1), a polar compound or a randomizer may be used, for example, for the purpose of controlling the rate of polymerization, changing the microstructure of the polymerized conjugated diene portion, or regulating the reactivity ratio between a conjugated diene monomer and a vinyl aromatic hydrocarbon monomer. Examples of the polar compound and the randomizer include ethers, amines, thioethers, phosphoramides, potassium or sodium alkylbenzenesulfonates, and potassium or sodium alkoxides.

Examples of the ethers which may be used include dimethyl ether, diethyl ether, diphenyl ether, tetrahydrofuran, diethyleneglycoldimethylether, and diethyleneglycoldibutylether. Examples of the amines include tertiary amines such as trimethylamine, triethylamine, and tetramethylethylenediamine, and other cyclic tertiary amines. Examples of the phosphines and phosphoramides include triphenylphosphine and hexamethylphosphoramide. The amount of the randomizer used is typically 30 to 10,000 ppm, preferably 30 to 8,000 ppm, more preferably 30 to 5,000 ppm based on the solvent used for polymerization.

According to the present invention, the polymerization temperature in producing the base block copolymer (B-1) is preferably −10 to 150° C., more preferably 30 to 120° C. The time required for the polymerization varies depending on conditions, but it is preferably within 48 hours, particularly preferably 0.5 to 10 hours. The atmosphere of the polymerization system is preferably an atmosphere of an inert gas such as nitrogen gas. The polymerization pressure needs only to be in a range of pressure enough to maintain the monomer and the solvent in the liquid phase in the above-described polymerization temperature range and is not particularly limited, but it is typically 0.2 to 2 MPa, preferably 0.3 to 1.5 MPa, more preferably 0.3 to 1 MPa. In addition, it is preferable to ensure that such impurities to inactivate a catalyst and a living polymer, such as, for example, water, oxygen, and carbon dioxide gas are not mixed into the polymerization system.

The primary modified block copolymer as the component (B) used in the present invention is a primary modified block copolymer comprising a primary modifier group (B-2), produced by addition reaction of a primary modifier containing a functional group to the living end of the base block copolymer (B-1) obtained using an organolithium compound as a polymerization catalyst; the hydrogenated product thereof is a hydrogenated primary modified block copolymer obtained by subjecting the above-described primary modified block copolymer to hydrogenation reaction. The primary modifier group (B-2) comprises at least one functional group selected from the group consisting of a hydroxyl group, a carboxyl group, a carbonyl group, a thiocarbonyl group, an acid halide group, an acid anhydride group, a carboxylic acid group, a thiocarboxylic acid group, an aldehyde group, a thioaldehyde group, a carboxylate group, an amide group, a sulfonic acid group, a sulfonate group, a phosphoric acid group, a phosphate group, an amino group, an imino group, a nitrile group, a pyridyl group, a quinoline group, an epoxy group, a thioepoxy group, a sulfide group, an isocyanate group, an isothiocyanate group, a silanol group, an alkoxysilane group containing 1 to 24 carbon atoms, silicon halide groups, tin halide groups, alkoxytin groups, and a phenyltin group.

The primary modified block copolymer having the bonded primary modifier group (B-2) comprising such a functional group can be obtained by addition reaction of a primary modifier comprising at least one functional group selected from the group consisting of the above-described functional groups or the primary modifier whose functional group is protected by a known method, to the living end of the base block copolymer (B-1).

Other methods include a method involving reacting an organoalkaline metal compound such as an organolithium compound with the base block copolymer (B-1) (metallation reaction) and addition reacting the above-described modifier to the base block copolymer (B-1) having the added organoalkaline metal. Depending on the kind of the modifier, the hydroxyl group, amino group, or the like may form an organometallic salt at the stage when the modifier has been allowed to react, but in that case it can be returned to the hydroxyl group, amino group, or the like by treatment with a compound having active hydrogen such as water and alcohol.

According to the present invention, the reaction pressure in the modification reaction of the base block copolymer (B-1) is not particularly limited, but typically 0.2 to 2 MPa, preferably 0.3 to 1.5 MPa, more preferably 0.3 to 1 MPa. The reaction temperature is preferably in the range of 0 to 140° C., more preferably 30 to 120° C., still more preferably 50 to 100° C. The reaction time generally depends on the reaction temperature in preparation, but is in the range of 1 second to 3 hours.

According to the present invention, in reacting the modifier with the living end of the base block copolymer (B-1) an unmodified base block copolymer (B-1) may be partially mixed in the primary modified block copolymer. It is recommended that the proportion of the unmodified base block copolymer (B-1) mixed in the primary modified block copolymer (B) be preferably 70 mass % or less, more preferably 60 mass % or less, still more preferably 50 mass % or less.

The primary modified block copolymer (B) used in the present invention is particularly preferably a primary modified block copolymer having at least one bonded primary modifier, group (B-2) comprising at least one functional group selected from the group consisting of a hydroxyl group, an epoxy group, an amino group, a silanol group, and an alkoxysilane group containing 1 to 24 carbon atoms.

According to the present invention, preferred examples of the at least one functional group selected from the group consisting of a hydroxyl group, an epoxy group, an amino group, a silanol group, and an alkoxysilane group containing 1 to 24 carbon atoms, which the primary modifier group (B-2) comprises include functional groups represented by general formulas (a) to (m) below.

[Formula 3]

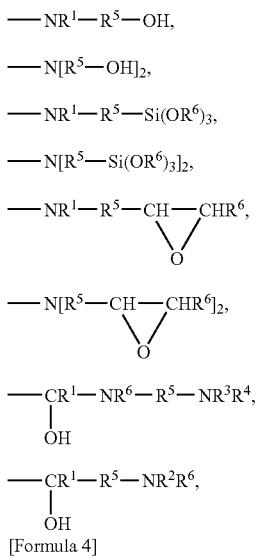

[Formula 4]

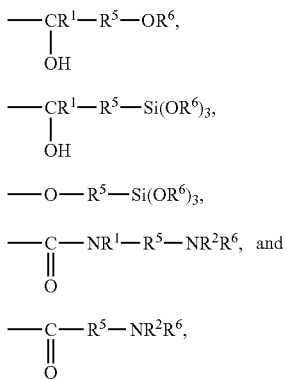

in the above formulas (a) to (m),

N represents a nitrogen atom, Si is a silicon atom, O is an oxygen atom, C is a carbon atom, and H is a hydrogen atom;

$R^1$ to $R^4$ each independently represent a hydrogen atom and a monovalent hydrocarbon group containing 1 to 24 carbon atoms, wherein the monovalent hydrocarbon groups are unsubstituted or substituted by at least one functional group each independently selected from the group consisting of a hydroxyl group, an epoxy group, an amino group, a silanol group, and an alkoxysilane group containing 1 to 24 carbon atoms;

$R^5$s each independently represent a divalent hydrocarbon group containing 1 to 48 carbon atoms, wherein the divalent hydrocarbon groups are unsubstituted or substituted by at least one functional group each independently selected from the group consisting of a hydroxyl group, an epoxy group, an amino group, a silanol group, and an alkoxysilane group containing 1 to 24 carbon atoms;

$R^6$s each independently represent a hydrogen atom and an alkyl group containing 1 to 8 carbon atoms;

wherein $R^1$ to $R^5$ may optionally each independently have at least one atom selected from the group consisting of an oxygen atom, a nitrogen atom, and a silicon atom, bonded in a bonding mode other than those for a hydroxyl group, an epoxy group, an amino group, a silanol group, and alkoxysilane groups.

According to the invention, examples of the primary modifier used for obtaining the primary modified block copolymer (B) having at least one bonded primary modifier group (B-2) comprising at least one functional group selected from the group consisting of a hydroxyl group, an epoxy group, an amino group, a silanol group, and an alkoxysilane group containing 1 to 24 carbon atoms include the following.

For example, they are compounds having an epoxy group, such as tetraglycidyl-meta-xylenediamine, tetraglycidyl-1,3-bisaminomethylcyclohexane, tetraglycidyl-p-phenylenediamine, tetraglycidyldiaminodiphenylmethane, diglycidylaniline, and diglycidyl-ortho-toluidine.

In addition, they are compounds having an epoxy group and an alkoxysilane group, such as
γ-glycidoxyethyltrimethoxysilane,
γ-glycidoxypropyltrimethoxysilane,
γ-glycidoxybutyltrimethoxysilane,
γ-glycidoxypropyltriethoxysilane,
γ-glycidoxypropyltripropoxysilane,
γ-glycidoxypropyltributoxysilane,
γ-glycidoxypropyltriphenoxysilane,
γ-glycidoxypropylmethyldimethoxysilane,
γ-glycidoxypropylethyldimethoxysilane,
γ-glycidoxypropylethyldiethoxysilane,
γ-glycidoxypropylmethyldiethoxysilane,
γ-glycidoxypropylmethyldipropoxysilane,
γ-glycidoxypropylmethyldibutoxysilane,
γ-glycidoxypropylmethyldiphenoxysilane,
γ-glycidoxypropyldimethylmethoxysilane,
γ-glycidoxypropyl-diethylethoxysilane,
γ-glycidoxypropyldimethylethoxysilane,
γ-glycidoxypropyldimethylphenoxysilane,
γ-glycidoxypropyldiethylmethoxysilane,
γ-glycidoxypropylmethyldiisopropenoxysilane,
bis(γ-glycidoxypropyl)dimethoxysilane,
bis(γ-glycidoxypropyl)diethoxysilane,
bis(γ-glycidoxypropyl)dipropoxysilane,
bis(γ-glycidoxypropyl)dibutoxysilane,
bis(γ-glycidoxypropyl)diphenoxysilane,
bis(γ-glycidoxypropyl)methylmethoxysilane,
bis(γ-glycidoxypropyl)methylethoxysilane,
bis(γ-glycidoxypropyl)methylpropoxysilane,
bis(γ-glycidoxypropyl)methylbutoxysilane,
bis(γ-glycidoxypropyl)methylphenoxysilane,
tris(γ-glycidoxypropyl)methoxysilane,
γ-methacryloxypropyltrimethoxysilane,
γ-methacryloxypropyltriethoxysilane,
γ-methacryloxymethyltrimethoxysilane,
γ-methacryloxyethyltriethoxysilane,
bis(γ-methacryloxypropyl)dimethoxysilane,
tris(γ-methacryloxypropyl)methoxysilane,
β-(3,4-epoxycyclohexyl)ethyl-trimethoxysilane,
β-(3,4-epoxycyclohexyl)ethyl-triethoxysilane,
β-(3,4-epoxycyclohexyl)ethyl-tripropoxysilane,
β-(3,4-epoxycyclohexyl)ethyl-tributoxysilane,
β-(3,4-epoxycyclohexyl)ethyl-triphenoxysilane,
β-(3,4-epoxycyclohexyl)propyl-trimethoxysilane,
β-(3,4-epoxycyclohexyl)ethyl-methyldimethoxysilane,
β-(3,4-epoxycyclohexyl)ethyl-ethyldimethoxysilane,
β-(3,4-epoxycyclohexyl)ethyl-ethyldiethoxysilane,
β-(3,4-epoxycyclohexyl)ethyl-methyldiethoxysilane,
β-(3,4-epoxycyclohexyl)ethyl-methyldipropoxysilane,
β-(3,4-epoxycyclohexyl)ethyl-methyldibutoxysilane,
β-(3,4-epoxycyclohexyl)ethyl-methyldiphenoxysilane, β-(3,4-epoxycyclohexyl)ethyl-dimethylmethoxysilane,
β-(3,4-epoxycyclohexyl)ethyl-diethylethoxysilane,
β-(3,4-epoxycyclohexyl)ethyl-dimethylethoxysilane,
β-(3,4-epoxycyclohexyl)ethyl-dimethylpropoxysilane,
β-(3,4-epoxycyclohexyl)ethyl-dimethylbutoxysilane,
β-(3,4-epoxycyclohexyl)ethyl-dimethylphenoxysilane,
β-(3,4-epoxycyclohexyl)ethyl-diethylmethoxysilane, and
β-(3,4-epoxycyclohexyl)ethyl-methyldiisopropenoxysilane Further, they are compounds having a nitrogen atom and an oxygen atom, such as 1,3-dimethyl-2-imidazolidinone, 1,3-diethyl-2-imidazolidinone, N,N'-dimethylpropyleneurea, N-methylpyrrolidone, and N-(1,3-dimethylbutylidene)-3-(triethoxysilyl)-1-propaneamine.

The above-described modifier is allowed to react to provide the primary modified block copolymer (B) having at least one bonded primary modifier group (B-2) comprising at least one functional group selected from the group consisting of a hydroxyl group, an epoxy group, an amino group, a silanol group, and an alkoxysilane group containing 1 to 24 carbon atoms. When a modifier containing a functional group is addition reacted to the living end of a base block copolymer (B-1) having block A and block B, the living end of the base block copolymer (B-1) may be that originating from either the block A or the block B.

It is recommended that the usage amount of the modifier be from more than 0.5 equivalent to 10 equivalents, preferably from more than 0.7 equivalent to 5 equivalents, more preferably from more than 1 equivalent to 4 equivalents based on 1 equivalent of the living end of the base block copolymer (B-1). In this respect, according to the present invention, the amount of the living end of the base block copolymer (B-1) may be calculated from the amount of the organolithium compound used for polymerization and the number of the lithium atoms which the organolithium compound has, or from the number average molecular weight of the resultant polymer.

According to the present invention, the hydrogenated product of the primary modified block copolymer (B) is obtained by hydrogenating the primary modified block copolymer obtained above. The hydrogenation catalyst is not particularly limited; (1) a supported heterogeneous hydrogenation catalyst in which a metal such as Ni, Pt, Pd, and Ru is supported on carbon, silica, alumina, diatomaceous earth, or the like, (2) a so-called Ziegler type hydrogenation catalyst using a transition metal salt such as organic salts or acetylacetone salts including Ni, Co, Fe, and Cr, and a reducing agent such as organoaluminums, and (3) a homogeneous hydrogenation catalyst such as so-called organometallic complexes (for example, organometal compounds including Ti, Ru, Rh, and Zr) which have been previously known, are used. Specific hydrogenation catalysts which may be used are hydrogenation catalysts as described in Japanese Patent Publication No. 42-8704 (corresponding to CA815575A), Japanese Patent Publication No. 43-6636 (corresponding to U.S. Pat. No. 3,333,024), Japanese Patent Publication No. 63-4841 (corresponding to U.S. Pat. No. 4,501,857), Japanese Patent Publication No. 01-37970 (corresponding to U.S. Pat. No. 4,673,714), Japanese Patent Publication No. 01-53851, and Japanese Patent Publication No. 02-9041. Preferred hydrogenation catalysts include a mixture of a titanocene compound and/or a reducing organometal compound.

Compounds as described in Japanese Patent Laid-Open No. 08-109219 may be used as the titanocene compound; specific examples thereof include compounds having at least one ligand possessing a (substituted) cyclopentadienyl skeleton such as biscyclopentadienyltitanium dichloride and monopentamethylcylopentadienyltitanium trichloride, an indenyl skeleton, or a fluorenyl skeleton. Examples of the reducing organometal compound include organoalkaline metal compounds such as organolithium, organomagnesium compounds, organoaluminium compounds, organoboron compounds, and organozinc compounds.

The hydrogenation reaction is typically conducted in the temperature range of 0 to 200° C., more preferably 30 to 150° C. It is recommended that the pressure of hydrogen used for the hydrogenation reaction is 0.1 to 15 MPa, preferably 0.2 to 10 MPa, more preferably 0.3 to 7 MPa. The hydrogenation reaction time is typically 3 minutes to 10 hours, preferably 10 minutes to 5 hours. The hydrogenation reaction may use a batch process, a continuous process, or a combination thereof.

In the hydrogenated product of the modified block copolymer (B) used in the present invention, the hydrogenation ratio of the unsaturated double bonds based on the conjugated diene monomer units may be optionally selected according to the purpose, and is not limited. To obtain a hydrogenated product of the modified block copolymer (B) excellent in thermal stability and weather resistance, it is recommended that the unsaturated double bonds based on the conjugated diene monomer units in the modified block copolymer (B) be hydrogenated in an amount of more than 70%, preferably 75% or more, more preferably 85% or more, particularly preferably 90% or more. To obtain a hydrogenated product of the modified block copolymer (B) excellent in thermal stability and graft, reactivity, the hydrogenation ratio is preferably 3 to 70% or 5 to 65%, particularly preferably 10 to 60%. The hydrogenation ratio of the aromatic double bonds based on the vinyl aromatic hydrocarbon monomer units in the modified block copolymer (B) is not particularly limited, but it is preferred that the hydrogenation ratio is 50% or less, preferably 30% or less, more preferably 20% or less. The hydrogenation ratio can be known using a nuclear magnetic resonance apparatus (NMR).

The primary modified block copolymer or its hydrogenated product as the component (B) used in the present invention typically has a 5 mass % styrene solution viscosity at 25° C. of 100 mPa·s or less, preferably 5 to 80 mPa·s, more preferably 10 to 60 mPa·s, still more preferably 10 to 50 mPa·s. A styrene solution viscosity of more than 100 mPa·s is unfavorable because it increases the size of rubber particles dispersed in the impact-resistant vinyl aromatic hydrocarbon resin and reduces the gloss.

The primary modified block copolymer or its hydrogenated product as the component (B) used in the present invention preferably has a weight average molecular weight (Mw) in polystyrene equivalent as determined by gel permeation chromatography (GPC) of 30,000 or more in view of the mechanical strength of resin or 600,000 or less, more preferably 50,000 to 500,000, still more preferably 10 to 450,000 in view of solubility in the vinyl aromatic hydrocarbon monomer or the like. The molecular weight distribution (the ratio (Mw/Mn) of the weight average molecular weight (Mw) and the number average molecular weight (Mn)) is 1.05 to 6, preferably 1.05 to 5, more preferably 1.05 to 4.

The weight average molecular weight (Mw) of the primary modified block copolymer or its hydrogenated product as the component (B) can be determined by performing measurement using GPC and finding the peak molecular weight in the chromatogram using a calibration curve determined from measurement for commercially available standard polystyrene (prepared employing the peak molecular weight of standard polystyrene). The molecular weight distribution of the polymer can be likewise determined from measurement using GPC.

The solution of the primary modified block copolymer or its hydrogenated product as the component (B) obtained as described above can be, if necessary, subjected to the removal of the catalyst residue, followed by separating the primary modified block copolymer or its hydrogenated product from the solution. Methods for separating the solvent include, for example, a method involving adding a polar solvent forming a poor solvent with respect to the polymer, such as actone and alcohol to the solution after polymerization to precipitate the primary modified block copolymer or its hydrogenated product for recovery, a method involving introducing the solution of the primary modified block copolymer or its hydrogenated product into boiling water under stirring to remove the solvent by steam stripping for recovery, and a method involving directly heating the polymer solution to distil off the solvent. In this respect, a stabilizer such as phenolic, phosphoric, sulfuric, and aminic stabilizers may be added to the modified block copolymer (B) used in the present invention. The stabilizer may be any known stabilizer which has been previously used; various antioxidants such as phenolic compounds (e.g., 2,6-di-tert-butyl-4-methylphenol and n-octadecyl-3-(3',5-di-tert-butyl-4'-hydroxyphenyl)propionate), organophosphite-based compounds (e.g., tris-(2,4-di-tert-butylphenyl)phosphite), and sulfur-containing phenolic compounds (e.g., 4,6-bis[(octylthio)methyl]-o-cresol) may be used alone or in a combination of two kinds or more. The amounts of these stabilizers may be properly selected depending on the kinds and combinations of the stabilizers used.

The secondary modified block copolymer (B) used in the present invention is a secondary modified block copolymer obtained by reacting the above-described primary modified block copolymer or its hydrogenated product with a secondary modifier reactive with the functional group of the primary modified block copolymer or the like. The secondary modified block copolymer can be used as the component (B) to provide a resin further excellent in the balance of impact strength and appearance characteristics.

For the purpose of the present invention, the secondary modifier is preferably a secondary modifier comprising at least one functional group selected from the group consisting of a hydroxyl group, an amino group, a carboxyl group, an acid anhydride group, an isocyanate group, an epoxy group, a silanol group, and an alkoxysilane group containing 1 to 24 carbon atoms. The secondary modifier is more preferably a secondary modifier comprising at least two functional groups of at least one kind selected from the group consisting of the above-described functional groups. However, when the functional group is an acid anhydride group, the modifier may be a secondary modifier comprising one acid anhydride group. The secondary modifier functions as a crosslinking agent. When the secondary modifier is reacted, for example, with the primary modified block copolymer, the secondary modifier is used in an amount of 0.3 to 10 moles, preferably 0.4 to 5 moles, more preferably 0.5 to 4 moles per one equivalent of the functional group bonded to the primary modified block copolymer.

A method for reacting the secondary modifier with the primary modified block copolymer or its hydrogenated product is not particularly restricted; a known method may be used. Examples thereof include a method involving melt kneading and a method involving the dissolution or dispersion mixing of these components in a solvent or the like for reaction. In the method involving the dissolution or dispersion mixing of these components in a solvent or the like for reaction, the solvent is not particularly limited provided that it dissolves or disperses these components, and examples of the solvent which may be used include halogen-containing solvents such as carbon tetrachloride, dichloromethane, and chloroform, esters solvents such as methyl acetate and ethyl acetate, and ether type solvents such as diethyl ether, dimethyl ether, methyl ethyl ketone, and tetrahydrofuran, as well as aliphatic hydrocarbons such as butane, pentane, hexane, isopentane, heptane, octane, and isooctane, alicyclic hydrocarbons such as cyclopentane, methylcyclopentane, cyclohexane, methylcyclohexane, and ethylcyclohexane, and aromatic hydrocarbons such as benzene, toluene, ethylbenzene, and xylene. In such methods, the temperature for reacting the components is typically −10 to 150° C., preferably 30 to 120° C. The time necessary for the reaction varies depending on conditions, but is typically within 3 hours, preferably several seconds to one hour. The reaction pressure is typically 0.1 to 2 MPa, preferably 0.1 to 1.5 MPa, more preferably 0.1 to 1 MPa.

A particularly preferred method is a method involving adding the secondary modifier to the solution in which the primary modified block copolymer or its hydrogenated product has been produced, for reaction to provide the secondary modified block copolymer. In this case, the primary modified block copolymer or its hydrogenated product may be also subjected to neutralization treatment before reaction with the secondary modifier.

Specific examples of the secondary modifier as a crosslinking agent having a carboxyl group include aliphatic carboxylic acids such as maleic acid, oxalic acid, succinic acid, adipic acid, azelaic acid, sebacic acid, dodecanedicarboxylic acid, carbarylic acid, cyclohexanedicarboxylic acid, and cyclopentanedicarboxylic acid, and aromatic carboxylic acids such as terephthalic acid, isophthalic acid, ortho-phthalic acid, naphthalenedicarboxylic acid, biphenyldicarboxylic acid, trimesic acid, trimellitic acid, and pyromellitic acid.

Examples of the secondary modifier having an acid anhydride group include maleic anhydride, itaconic anhydride, pyromellitic anhydride, cis-4-cyclohexane-1,2-dicarboxylic anhydride, 1,2,4,5-benzenetetracarboxylic dianhydride, and 5-(2,5-dioxytetrahydro-3-furanyl)-3-methyl-3-cyclohexene-1,2-dicarboxylic anhydride.

Examples of the secondary modifier having an isocyanate group include toluoylene diisocyanate, diphenylmethane diisocyanate, and polyfunctional aromatic isocyanates (that is, compounds having 3 or more isocyanate groups bonded to an aromatic ring).

Examples of the secondary modifier having an epoxy group include tetraglycidyl-1,3-bisaminomethylcyclohexane, tetraglycidyl-m-xylenediamine, diglycidylaniline, ethylene glycol diglycidyl, propylene glycol diglycidyl, diglycidyl terephthalate acrylate, and other epoxy compounds as described as modifiers used for obtaining primary modified block copolymers or their hydrogenated products.

Examples of the secondary modifier having a silanol group include hydrolysates of alkoxysilane compounds containing 1 to 24 carbon atoms as described as modifiers used for obtaining primary modified block copolymers or their hydrogenated products. Examples of the secondary modifier having an alkoxysilane group containing 1 to 24 carbon atoms include bis-(3-triethoxysilylpropyl)-tetrsulfane, bis-(3-triethoxysilylpropyl)-disulfane, ethoxysiloxane oligomers, and other silane compounds as described as modifiers used for obtaining primary modified block copolymers or their hydrogenated products.

According to the present invention, the secondary modifier is particularly preferably a carboxylic acid having two or more carboxyl groups or its acid anhydride, or a modifier having two or more of an acid anhydride group, an isocyanate group, an epoxy group, a silanol group, and an alkoxysilane group containing 1 to 24 carbon atoms; examples thereof include maleic anhydride, pyromellitic anhydride, 1,2,4,5-benzenetetracarboxylic dianhydride, tolylenediisocyanate, tetraglycidyl-1,3-bisaminomethylcyclohexane, and bis-(3-triethoxysilylpropyl)-tetrasulfane.

The impact-resistant vinyl aromatic hydrocarbon resin of the present invention is obtained by radical polymerization of 75 to 98 parts by mass, preferably 80 to 95 parts by mass, more preferably 85 to 95 parts by mass of a vinyl aromatic hydrocarbon monomer (A-1) or a mixture of a vinyl aromatic hydrocarbon monomer and a monomer copolymerizable therewith (A-2) with 2 to 25 parts by mass, preferably 5 to 20 parts by mass, more preferably 5 to 15 parts by mass of the above-described modified block copolymer (B).

A method for obtaining the impact-resistant vinyl aromatic hydrocarbon resin of the present invention is not particularly restricted provided that consideration is given so that it satisfies the structural requirements of the invention, and may be a known method.

Typically preferred is a method which involves dissolving a primary modified block copolymer, a secondary modified block copolymer, or a hydrogenated product thereof as the component (B) in a vinyl aromatic hydrocarbon monomer (A-1) or a mixture of a vinyl aromatic hydrocarbon monomer and a monomer copolymerizable therewith (A-2), followed by graft polymerization using a bulk polymerization method, a bulk-suspension polymerization method, or a solution polymerization method under stirring so that shear stress is applied to the rubber solution to provide an impact-resistant vinyl aromatic hydrocarbon resin in which the primary modified block copolymer, the secondary modified block copolymer, or a hydrogenated product thereof is dispersed in particulate form in a matrix comprising the vinyl aromatic hydrocarbon monomer or the mixture of a vinyl aromatic hydrocarbon monomer and a monomer copolymerizable therewith. In this respect, in the previously described Japanese Patent Laid-Open No. 2003-313255 the graft polymerization as described above has been performed in the presence of an inorganic filler to provide a styrene resin having improved impact resistance, but the resin of the present invention has excellent impact resistance comparable to the resin in the above publication even without using an inorganic filler.

In obtaining the resin of the present invention, an inert solvent may be also added to the vinyl aromatic hydrocarbon monomer (A-1) or the mixture of a vinyl aromatic hydrocarbon monomer and a monomer copolymerizable therewith (A-2), followed by polymerization. In addition to ethylbenzene, toluene, or the like, a polar solvent such as methyl ethyl ketone and cyclohexane may be used as the inert solvent. These solvents may be used in a combination of two kinds or more as well as alone. The amounts of these inert solvents are each preferably 100 parts by mass or less, more preferably 50 parts by mass or less based on 100 parts by mass of the liquid mixture obtained by dissolving the modified block copolymer (B) in the vinyl aromatic hydrocarbon monomer (A-1) or the mixture (A-2).

According to the present invention, in radical polymerizing a vinyl aromatic hydrocarbon monomer (A-1) or mixture of a vinyl aromatic hydrocarbon monomer and a monomer copolymerizable therewith (A-2) in which a modified block copolymer as the component (B) is dissolved, the polymerization may be also carried out in the presence of an organic peroxide or an azo compound particularly when it is performed at low temperature.

Examples of the organic peroxide include peroxy ketals such as 1,1-bis(t-butylperoxy)cyclohexane and 1,1-bis(t-butylperoxy)3,3,5-trimethylcyclohexane.

Examples thereof also include dialkyl peroxides such as di-t-butyl peroxide, 2,5-dimethyl-2,5-di(t-butylperoxy)hexane, and dicumyl peroxide.

Examples thereof also include diacyl peroxides such as benzoyl peroxide, m-toluoyl peroxide, and lauroyl peroxide.

Examples thereof also include peroxydicarbonates such as dimyristyl peroxydicarbonate and diisopropyl peroxydicarbonate.

Examples thereof also include peroxyesters such as t-butyl peroxyisopropylcarbonate, t-butyl peroxyacetate, di-t-butyl-diperoxyisophthalate, and t-butylperoxybenzoate.

Examples thereof also include ketone peroxides such as cyclohexanone peroxide and methyl ethyl ketone peroxide.

Further, hydroperoxides such as p-mentahydroperoxide, t-butyl hydroperoxide, and cumene hydroperoxide and the like are used.

Examples of the azo compound used include azobisisobutylonitrile and azobiscyclohexanecarbonitrile. These compounds are used alone or in a combination of two kinds or more. The usage amount of the organic peroxide or azo compound is preferably in the range of 10 to 1,000 ppm based on the above-described vinyl monomer mixture.

According to the present invention, a known chain transfer agent is also used. Examples of the chain transfer agent which may be used include mercaptans such as n-dodecyl mercaptan and tert-dodecyl mercaptan; α-methyl styrene dimer; terpenes such as 1-phenylbutene-2-florene and diterpene; and halogen compounds such as chloroform. The amount of the chain transfer agent used is typically 10 to 1,000 ppm based on the above-described vinyl monomer mixture.

In the resin of the present invention, a known stabilizer such as an antioxidant and an ultraviolet light stabilizer may be also added. Examples of the antioxidant include octadecyl-3-(3,5-di-t-butyl-4-hydroxyphenyl)propionate, 2,6-di-t-butyl-4-methylphenol, 2-(1-methylcyclohexyl)-4,6-dimethylphenol, 2,2'-methylenebis(4-ethyl-6-t-butylphenol), 4,4'-thiobis(6-t-butyl-3-methylphenol), 2,4-bis[(octylthio) methyl]-o-cresol, triethylene glycol-bis[3-(3-t-butyl-5-methyl-4-hydroxyphenyl)propionate], tris(dinonylphenyl) phosphite, and tris-(2,4-di-t-butylphenyl)phosphite; the addition amount thereof is 0.01 to 5 parts by mass, preferably 0.1 to 2 parts by mass based on 100 parts by mass of the resin.

Examples of the ultraviolet light stabilizer include triazolic compounds such as 2-(5-methyl-2-hydroxyphenyl)benzotriazole and 2-(3,5-di-t-butyl-2-hydroxyphenyl)benzotriazole; hindered aminic compounds such as bis(2,2,6,6-tetramethyl-4-piperidyl)sebacate; and p-t-butylphenyl salicylate and 2,2'-dihydroxy-4-methoxybenzophenone. It is particularly preferable that a triazolic compound and a hindered aminic compound are used alone or in combination. The addition amounts of these ultraviolet light stabilizers are each preferably 0.01 to 5 parts by mass, more preferably 0.05 to 2 parts by mass based on 100 parts by mass of the resin.

A conventionally used internal lubricant such as liquid paraffin, mineral oil, and organopolysiloxanes can be also added as needed. For example, polydimethylsiloxane as an organopolysiloxane may be added in an amount of 0.005 to 10 parts by mass based on 100 parts by mass of the resin.

The gel content (the content of toluene-insoluble matter) of the vinyl aromatic hydrocarbon resin thus obtained is preferably in the range of 5 to 75 mass %, more preferably 10 to 50 mass %. An insufficient gel content results in the resin being inferior in impact resistance, and an excessive gel content is unfavorable in processing because it reduces the flowability of the resin.

The swelling index of the gel of the resin in toluene (the mass of toluene-swollen matter/the dry mass after desolvation) is preferably in the range of 5 to 15, more preferably 7 to 12. An insufficient swelling index results in the resin being inferior in impact resistance, and an excessive swelling index is unfavorable because it reduces the impact resistance and deteriorates the gloss. The swelling index can be controlled, in graft polymerizing the vinyl aromatic hydrocarbon monomer using bulk polymerization, bulk-suspension polymerization, or solution polymerization, for example, by adjusting the final reaction rate and the devolatilization temperature of an unreacted monomer.

The molecular weight of the matrix portion is preferably in the range of 70,000 to 500,000, more preferably 100,000 to 300,000 in the form of weight average molecular weight in polystyrene equivalent as determined by gel permeation chromatography. Less than 70,000 reduces the impact resistance, and more than 500,000 is unfavorable in processing because it deteriorates the flowability.

The size of rubber particles dispersed in the impact-resistant vinyl aromatic hydrocarbon resin of the present invention is in the range of 0.2 to 3 μm, preferably 0.3 to 2 μm. Particularly, to obtain a high-gloss resin, it is preferably in the range of 0.5 to 1.5 μm. A rubber particle size of less than 0.2 μm reduces the impact strength although it improves the gloss, while more than 3 μm is unfavorable because of the deteriorated gloss although it enhances the impact strength. The distribution of the rubber particle sizes can be determined using, for example, a laser diffraction particle size distribution analyzer; the distribution is preferably a single sharp distribution, but may be a broad or bimodal distribution.

In processing the resin obtained in the present invention, further, a flame retardant and a flame retardant auxiliary may be blended and a flame-retardant recipe may be applied, as needed. The flame retardants, which have various types, include all of the previously known flame retardants; for example, halogenic retardants, phosphoric retardants, hydroxidic retardants, and siliconic retardants are effective. Examples thereof include decabromodiphenyl oxide, tetrabromobisphenol A, tetrabromobisphenol A oligomer, tris-(2, 3-dibromopropyl-1)isocyanurate, ammonium phosphate, red phosphorus, tricresyl phosphate, magnesium hydroxide, and aluminium hydroxide. Examples of the flame retardant auxiliary include antimony trioxide, antimony pentaoxide, sodium antimonite, antimony trichloride, antimony pentachloride, zinc borate, barium metaborate, and zirconium oxide. The amount of the flame retardant used is typically 5 to 60 parts by mass, preferably 5 to 40 parts by mass based on 100 parts by mass of the resin. The amount of the flame retardant auxiliary used is typically 2 to 30 parts by mass, preferably 2 to 20 parts by mass based on 100 parts by mass of the resin.

Particularly, the impact-resistant vinyl aromatic hydrocarbon resin of the present invention and a non-halogenic flame retardant are combined to markedly improve the dispersibility of the retardant in the resin to provide a flame-retarded impact-resistant vinyl aromatic hydrocarbon resin excellent in impact resistance and impact strength retention and flame retardance in the presence of the flame retardant.

Various additives such as a lubricant, a mold release, a filler, an antistatic agent, and a colorant may be also blended as needed. In addition, the resin may be mixed with other thermoplastic resins such as, for example, general purpose polystyrene, AS resin, ABS resin, AES resin, MBS resin, polyphenylene ether, polycarbonate, styrene-butadiene copolymer, methyl methacrylate-styrene copolymer resin, maleic anhydride-styrene copolymer resin, polyamide resin, and polyester resin. These resins are added to confer heat resistance, rigidity, impact resistance, good appearance, coatability, and the like, and used by blending, depending on the intended application. The amounts of these additives are each typically 1 to 70 mass %, preferably 1 to 50 mass %.

Particularly, when the resin of the present invention is a so-called ABS-based resin, such blending provides a resin composition excellent in impact resistance compared to a conventional polycarbonate resin/ABS-based resin composition.

The vinyl aromatic hydrocarbon resin of the present invention can be molded by processing methods such as injection molding and extrusion molding to make a wide variety of practically useful articles. The applications thereof include cabinets, housings, and the like for electrical products and office automation equipment, interior and exterior parts for automobiles, parts for houses, furnishings, and the like, antenna parts for broadcast or communication, and other wide-ranging applications.

EXAMPLES

The present invention is specifically described below based on Examples. However, the invention is not intended to be limited to these examples.

1. Evaluation of the Characteristics and Physical Properties of Block Copolymers In Examples and Comparative Examples below, the characteristics and physical properties of a modified block copolymer and an unmodified block copolymer were evaluated as follows.

(1) Styrene Content

The styrene content was determined using an ultraviolet spectrophotometer (UV-2450 manufactured by Shimadzu Corporation, Japan).

(2) Styrene Block Ratio

The styrene block ratio was determined using a polymer before hydrogenation by a method described in I. M. Kolthoff, et al., J. Polym. Sci. 1, 429 (1946). Specifically, a predetermined amount (30 to 50 mg) of an unhydrogenated block copolymer was precisely weighed and dissolved in about 10 ml of chloroform. Osmium tetroxide (a catalyst) and tertiary-butyl hydroperoxide (an oxidizing agent) were added thereto, which was then boiled at 100° C. for 20 minutes to oxidation-decompose the block copolymer. To the resultant reaction mixture was added 200 ml of methanol to precipitate polystyrene. The precipitate was filtered (using 11G4 manufactured by Sibata Scientific Technology Ltd., Japan) to provide a filtration residue consisting of polystyrene, followed by measuring the weight of the resultant polystyrene (where a styrene polymer component having a polymerization degree of 30 or less is excluded). The styrene block ratio was calculated from the following equation.

Styrene block ratio(weight %)=(the weight of the filtration residue/the total weight of styrene monomer units in the above-described predetermined amount of the block copolymer)×100

(3) Vinyl Bonding Amount and Hydrogenation Ratio

The vinyl bonding amount and hydrogenation ratio were determined using a nuclear magnetic resonance apparatus (DPX-400 manufactured by BRUKER, Germany).

(4) Molecular Weight and Molecular Weight Distribution

The molecular weight and molecular weight distribution were measured using GPC (apparatus: LC10 manufactured by Shimadzu Corporation, Japan, column: Shodex manufactured by Showa Denko KK, Japan). Tetrahydrofuran was used as a solvent, and the measurement was carried out under a condition of a temperature of 35° C. The molecular weight is a weight average molecular weight obtained by finding the peak molecular weight in the chromatogram using a calibration curve determined from measurement for commercially available standard polystyrene (prepared employing the peak molecular weight of standard polystyrene).

(5) Proportion of a Modified Block Copolymer in a Block Copolymer After Modification Reaction In 20 ml of tetrahydrofuran were dissolved 10 mg of a block copolymer after modification reaction and 10 mg of low molecular weight internal standard polystyrene having a weight average molecular weight of 8,000 to make a sample solution. The sample solution was subjected to GPC measurement using the same method as in the above (4), and the ratio (i) of the block copolymer (containing an unmodified polymer) after modification reaction to the standard polystyrene was determined from the resultant chromatogram. The above-described sample solution was also subjected to GPC measurement using the same method as in the above (4) except for the use of a column of Zorbax (a silica-based gel filler) which was a column manufactured by DuPont, USA to provide a chromatogram. The modified polymer adsorbs to the GPC column using a silica-based gel as a filler, but the unmodified polymer does not adsorb to the GPC column; therefore, the ratio (ii) of the unmodified polymer to the standard polystyrene can be determined from the resultant chromatogram. From the ratios (i) and (ii) above, the proportion (%) of the modified polymer in the block copolymer (containing an unmodified polymer) after modification reaction was calculated using the equation: (1−ratio (ii)/ratio (i))×100.

(6) Styrene Solution Viscosity

A 5 mass % styrene solution of a polymer was prepared to determine the styrene solution viscosity at 5° C. using a Cannon-Fenske viscometer.

2. Physical Property Evaluation of an Impact-Resistant Vinyl Aromatic Hydrocarbon Resin The physical properties of an impact-resistant vinyl aromatic hydrocarbon resin were evaluated by the following method.

(1) Notched Izod Impact Strength

The notched Izod impact strength was measured according to JIS-K-7110.

(2) Gloss

The degrees of gloss in the gate part and the end part (angle of incidence: 60°) were measured, and the values of measurements were averaged.

(3) Rubber Particle Size

The rubber particle size is a value obtained by dissolving the resultant resin in dimethylformamide (DMF) while applying supersonic vibration, followed by measurement using a laser diffraction particle size distribution analyzer (LA-920 manufactured by Horiba, Ltd., Japan) for calculation as a 50% median size.

3. Preparation of a Hydrogenation Catalyst

The hydrogenation catalyst used for the hydrogenation reaction of a modified block copolymer was prepared by the following method.

In a reaction vessel purged with nitrogen was charged 2 litters of dried and purified cyclohexane in which 40 mmoles of bis(η5-cyclopentadienyl)titaniumdi-(p-tolyl) and 150 grams of 1,2-polybutadiene (the amount of 1,2-vinyl bonding: about 85%) having a molecular weight of about 1,000 were then dissolved before adding a cyclohexane solution containing 60 mmmoles of n-butyllithium for reaction at room temperature for 5 minutes, followed by immediately adding 40 mmmoles of n-butanol and stirring before storage at room temperature.

4. Production of an Unmodified Block Copolymer and Primary Modified Block Copolymers (1) Copolymer a An autoclave which had an inner volume of 10 litters, was equipped with a stirrer and a jacket, and could be temperature controlled was used as a reactor. In the reactor were placed 680 g of impurities-free butadiene, 5,500 g of cyclohexane, and 1.37 g of tetrahydrofuran as a polar substance, and the inner temperature of the reactor was kept at 40° C. A 20 weight % cyclohexane solution containing 0.8 g of n-butyllithium as a polymerization initiator was supplied to the reactor. After the initiation of reaction, the inner temperature of the reactor was gradually increased by heat generation due to the polymerization. After the end of reaction, 120 g of styrene was placed in the reactor to continue polymerization, the final inner temperature of the reactor reaching 75° C. The polymerization reaction was carried out for about 25 minutes. The polymerization pressure increased within the range of 0.3 to 0.7 MPa as the reaction proceeded. After the end of polymerization reaction, 1,3-dimethyl-2-imidazolidinone was added as a modifier, to the reactor, in an amount of one equivalent based on the n-butyllithium used for the polymerization, which was then kept at 75° C. for 5 minutes to conduct a modification reaction. Subsequently, methanol and then a mixture of n-octadecyl-3-(3',5'-di-tert-butyl-4'-hydroxyphenyl)propionate and 4,6-bis[(octylthio)methyl]-o-cresol as a stabilizer were added, followed by removing the solvent. The characteristics of the resultant primary modified block copolymer (copolymer a) are shown in Table 1.

(2) Copolymer b

An autoclave which had an inner volume of 10 litters, was equipped with a stirrer and a jacket, and could be temperature controlled was used as a reactor. In the reactor were placed 520 g of impurities-free butadiene, 280 g of styrene, 5,500 g of cyclohexane, and 1.37 g of tetrahydrofuran as a polar substance, and the inner temperature of the reactor was kept at 40° C. A 20 weight % cyclohexane solution containing 1.12 g of n-butyllithium as a polymerization initiator was supplied to the reactor. After the initiation of reaction, the inner temperature of the reactor was gradually increased by heat generation due to the polymerization. The polymerization reaction was carried out for about 25 minutes. The polymerization pressure increased within the range of 0.3 to 0.7 MPa as the reaction proceeded. After the end of polymerization reaction, 1,3-dimethyl-2-imidazolidinone was added as a modifier, to the reactor, in an amount of one equivalent based on the n-butyllithium used for the polymerization, which was then kept at 75° C. for 5 minutes to conduct a modification reaction. Subsequently, methanol and then a mixture of n-octadecyl-3-(3',5'-di-tert-butyl-4'-hydroxyphenyl)propionate and 4,6-bis[(octylthio)methyl]-o-cresol as a stabilizer were added, followed by removing the solvent. The characteristics of the resultant primary modified block copolymer (copolymer b) are shown in Table 1.

(3) Copolymer c

An autoclave which had an inner volume of 10 litters, was equipped with a stirrer and a jacket, and could be temperature controlled was used as a reactor. In the reactor were placed 600 g of impurities-free butadiene, 200 g of styrene, 5,500 g of cyclohexane, and 1.37 g of tetrahydrofuran as a polar substance, and the inner temperature of the reactor was kept at 40° C. A 20 weight % cyclohexane solution containing 1.12 g of n-butyllithium as a polymerization initiator was supplied to the reactor. After the initiation of reaction, the inner temperature of the reactor was gradually increased by heat generation due to the polymerization. The polymerization reaction was carried out for about 25 minutes. The polymerization pressure increased within the range of 0.3 to 0.7 MPa as the reaction proceeded. After the end of polymerization reaction, tetraglycidyl-1,3-bisaminomethylcyclohexane was added as a modifier, to the reactor, in an amount of 1.5 equivalents based on the n-butyllithium used for the polymerization, which was then kept at 75° C. for 5 minutes to conduct a modification reaction. Subsequently, methanol and then a mixture of n-octadecyl-3-(3',5'-di-tert-butyl-4'-hydroxyphenyl)propionate and 4,6-bis[(octylthio)methyl]-o-cresol as a stabilizer were added, followed by removing the solvent. The characteristics of the resultant primary modified block copolymer (copolymer c) are shown in Table 1.

(4) Copolymer d

An autoclave which had an inner volume of 10 litters, was equipped with a stirrer and a jacket, and could be temperature controlled was used as a reactor. In the reactor were placed 480 g of impurities-free butadiene, 320 g of styrene, and 5,500 g of cyclohexane, and the inner temperature of the reactor was kept at 40° C. A 20 weight % cyclohexane solution containing 0.48 g of n-butyllithium as a polymerization initiator was supplied to the reactor. After the initiation of reaction, the inner temperature of the reactor was gradually increased by heat generation due to the polymerization. The final inner temperature of the reactor reached 75° C. The polymerization reaction was carried out for about 25 minutes. The polymerization pressure increased within the range of 0.3 to 0.7 MPa as the reaction proceeded. After the end of polymerization reaction, 1,3-dimethyl-2-imidazolidinone was added as a modifier, to the reactor, in an amount of one equivalent based on the n-butyllithium used for the polymerization, which was then kept at 75° C. for 5 minutes to conduct a modification reaction. Subsequently, methanol and then a mixture of n-octadecyl-3-(3',5'-di-tert-butyl-4'-hydroxyphenyl)propionate and 4,6-bis[(octylthio)methyl]-o-cresol as a stabilizer were added, followed by removing the solvent. The characteristics of the resultant primary modified block copolymer (copolymer d) are shown in Table 1.

(5) Copolymer e

An n-hexane solution containing a monomer mixture having a butadiene/styrene mass ratio of 75/25 at a concentration of 16 mass %, and a 1 weight % cyclohexanone solution of n-butyllithium were supplied at a speed of 157 g/minute and at such a speed to provide 0.15 g of n-butyllithium based on 100 g of the monomer, respectively to a tank reactor having an inner volume of 10 litters and equipped with a stirring device and a jacket to conduct continuous polymerization at 90° C. The polymerization pressure was adjusted into 0.7 MPa. The residence time in the reactor was 50 minutes.

The living polymer obtained in the continuous polymerization was then reacted with one equivalent of 1,3-dimethyl-2-imidazolidinone as a modifier based on the n-butyllithium used for the polymerization. The characteristics of the resultant primary modified block copolymer (copolymer e) are shown in Table 1.

(6) Copolymer f

An autoclave which had an inner volume of 10 litters, was equipped with a stirrer and a jacket and could be temperature controlled was used as a reactor. In the reactor were placed 560 g of impurities-free butadiene, 5,500 g of cyclohexane, and 1.37 g of tetrahydrofuran as a polar substance, and the inner temperature of the reactor was kept at 40° C. A 20 weight % cyclohexane solution containing 0.96 g of n-butyllithium as a polymerization initiator was supplied to the reactor. After the initiation of reaction, the inner temperature of the reactor was gradually increased by heat generation due to the polymerization. After the end of reaction, 240 g of styrene was placed in the reactor to continue polymerization, the final inner temperature of the reactor reaching 75° C. The polymerization reaction was carried out for about 25 minutes. The polymerization pressure increased within the range of 0.3 to 0.7 MPa as the reaction proceeded. After the end of polymerization reaction, N-(1,3-dimethylbutylidene)-3-(triethoxysilyl)-1-propaneamine was added as a modifier, to the reactor, in an amount of one equivalent based on the n-butyllithium used for the polymerization, which was then kept at 75° C. for 5 minutes to conduct a modification reaction. Subsequently, methanol and then a mixture of n-octadecyl-3-(3',5'-di-tert-butyl-4'-hydroxyphenyl)propionate and 4,6-bis[(octylthio)methyl]-o-cresol as a stabilizer were added, followed by removing the solvent. The characteristics of the resultant primary modified block copolymer (copolymer f) are shown in Table 1.

(7) Copolymer g

An autoclave which had an inner volume of 10 litters, was equipped with a stirrer and a jacket, and could be temperature controlled was used as a reactor. In the reactor were placed 620 g of impurities-free butadiene, 5,500 g of cyclohexane, and 1.37 g of tetrahydrofuran as a polar substance, and the inner temperature of the reactor was kept at 40° C. A 20 weight % cyclohexane solution containing 0.88 g of n-butyllithium as a polymerization initiator was supplied to the reactor. After the initiation of reaction, the inner temperature of the reactor was gradually increased by heat generation due to the polymerization. After the end of reaction, 180 g of styrene was placed in the reactor to continue polymerization, the final inner temperature of the reactor reaching 75° C. The polymerization reaction was carried out for about 25 minutes. The polymerization pressure increased within the range of 0.3 to 0.7 MPa as the reaction proceeded. After the end of polymerization reaction, γ-glycidoxypropyltriethoxysilane was added as a modifier, to the reactor, in an amount of one equivalent based on the n-butyllithium used for the polymerization, which was then kept at 75° C. for 5 minutes to conduct a modification reaction. Subsequently, methanol and then a mixture of n-octadecyl-3-(3',5'-di-tert-butyl-4'-hydroxyphenyl)propionate and 4,6-bis[(octylthio)methyl]-o-cresol as a stabilizer were added, followed by removing the solvent. The characteristics of the resultant primary modified block copolymer (copolymer g) are shown in Table 1.

(8) Copolymer h

An autoclave which had an inner volume of 10 litters, was equipped with a stirrer and a jacket, and could be temperature controlled was used as a reactor. In the reactor were placed 680 g of impurities-free butadiene, 5,500 g of cyclohexane, and 1.37 g of tetrahydrofuran as a polar substance, and the inner temperature of the reactor was kept at 40° C. A 20 weight % cyclohexane solution containing 0.8 g of n-butyllithium as a polymerization initiator was supplied to the reactor. After the initiation of reaction, the inner temperature of the reactor was gradually increased by heat generation due to the polymerization. After the end of reaction, 120 g of styrene was placed in the reactor to continue polymerization, the final inner temperature of the reactor reaching 75° C. The polymerization reaction was carried out for about 25 minutes. The polymerization pressure increased within the range of 0.3 to 0.7 MPa as the reaction proceeded. After the end of polymerization reaction, 1,3-dimethyl-2-imidazolidinone was added as a modifier, to the reactor, in an amount of one equivalent based on the n-butyllithium used for the polymerization, which was then kept at 75° C. for 5 minutes to conduct a modification reaction. Subsequently, methanol was added, and a hydrogenation catalyst was then added, to the resultant polymer, in an amount of 100 ppm of Ti equivalent based on 100 parts by mass of the polymer, followed by hydrogenation reaction at a hydrogen pressure of 0.7 MPa and a temperature of 65° C. The characteristics of the resultant hydrogenated primary modified block copolymer (copolymer h) are shown in Table 1.

(9) Copolymer i

An autoclave which had an inner volume of 10 litters, was equipped with a stirrer and a jacket, and could be temperature controlled was used as a reactor. In the reactor were placed 600 g of impurities-free butadiene, 200 g of styrene, 5,500 g of cyclohexane, and 1.93 g of tetrahydrofuran as a polar substance, and the inner temperature of the reactor was kept at 40° C. A 20 weight % cyclohexane solution containing 1.12 g of n-butyllithium as a polymerization initiator was supplied to the reactor. After the initiation of reaction, the inner temperature of the reactor was gradually increased by heat generation due to the polymerization. The final inner temperature of the reactor reached 75° C. The polymerization reaction was carried out for about 25 minutes. The polymerization pressure increased within the range of 0.3 to 0.7 MPa as the reaction proceeded. After the end of polymerization reaction, tetraglycidyl-1,3-bisaminomethylcyclohexane was added as a modifier, to the reactor, in an amount of 1.5 equivalents based on the n-butyllithium used for the polymerization, which was then kept at 75° C. for 5 minutes to conduct a modification reaction. Subsequently, methanol and then a mixture of n-octadecyl-3-(3',5'-di-tert-butyl-4'-hydroxyphenyl)propionate and 4,6-bis[(octylthio)methyl]-o-cresol as a stabilizer were added, followed by removing the solvent. The characteristics of the resultant primary modified block copolymer (copolymer i) are shown in Table 1.

(10) Copolymer j

An autoclave which had an inner volume of 10 litters, was equipped with a stirrer and a jacket, and could be temperature controlled was used as a reactor. In the reactor were placed 360 g of impurities-free butadiene, 440 g of styrene, 5,500 g of cyclohexane, and 1.37 g of tetrahydrofuran as a polar substance, and the inner temperature of the reactor was kept at 40° C. A 20 weight % cyclohexane solution containing 0.80 g of n-butyllithium as a polymerization initiator was supplied to the reactor. After the initiation of reaction, the inner temperature of the reactor was gradually increased by heat generation due to the polymerization. The final inner temperature of the reactor reached 75° C. The polymerization reaction was carried out for about 25 minutes. The polymerization pressure increased within the range of 0.3 to 0.7 MPa as the reaction proceeded. After the end of polymerization reaction, 1,3-dimethyl-2-imidazolidinone was added as a modifier, to the reactor, in an amount of one equivalent based on the n-butyllithium used for the polymerization, which was then kept at 75° C. for 5 minutes to conduct a modification reaction. Subsequently, methanol and then a mixture of n-octadecyl-3-(3',5'-di-tert-butyl-4'-hydroxyphenyl)propionate and 4,6-bis[(octylthio)methyl]-o-cresol as a stabilizer were added, followed by removing the solvent. The characteristics of the resultant primary modified block copolymer (copolymer j) are shown in Table 1.

(11) Copolymer k

An autoclave which had an inner volume of 10 litters, was equipped with a stirrer and a jacket, and could be temperature controlled was used as a reactor. In the reactor were placed 440 g of impurities-free butadiene, 360 g of styrene, 5,500 g of cyclohexane, and 2.0 g of tetrahydrofuran as a polar substance, and the inner temperature of the reactor was kept at 40° C. A 20 weight % cyclohexane solution containing 0.55 g of n-butyllithium as a polymerization initiator was supplied to the reactor. After the initiation of reaction, the inner temperature of the reactor was gradually increased by heat generation due to the polymerization. The final inner temperature of the reactor reached 75° C. The polymerization reaction was carried out for about 25 minutes. The polymerization pressure increased within the range of 0.3 to 0.7 MPa as the reaction proceeded. After the end of polymerization reaction, 1,3-dimethyl-2-imidazolidinone was added as a modifier, to the reactor, in an amount of one equivalent based on the n-butyllithium used for the polymerization, which was then kept at 75° C. for 5 minutes to conduct a modification reaction. Subsequently, methanol and then a mixture of n-octadecyl-3-(3',5'-di-tert-butyl-4'-hydroxyphenyl)propionate and 4,6-bis[(octylthio)methyl]-o-cresol as a stabilizer were added, followed by removing the solvent. The characteristics of the resultant primary modified block copolymer (copolymer k) are shown in Table 1.

(12) Copolymer l

An unmodified copolymer was obtained by the same method as that for production of copolymer a except for no addition of a modifier. The characteristics of the resultant copolymer (copolymer l) are shown in Table 1.

5. Production of Secondary Modified Block Copolymers

The secondary modifiers of the kinds and amounts shown in Table 2 were blended with the primary modified copolymers a, c, and, e obtained above, respectively, which were then kneaded under conditions of a filling factor of 65% and a rotor speed of 66/77 rpm using a closed kneader (interior volume: 1.7 litters) provided with a temperature controlling device, or melt kneaded, using a 30 mmφ twin screw extruder, at 220° C. and a screw speed of 190 rpm, for reaction to provide copolymers m, n, and o. The characteristics of the secondary modified block copolymers m, n, and o thus obtained are shown in Table 2.

Examples 1 to 11

Using the raw materials shown in Table 3, vinyl aromatic hydrocarbon resins were obtained by a bulk polymerization method described below.

To a reactor provided with a stirring device and a jacket were added 90 parts by mass of styrene and 10 parts by mass of modified copolymer, to which 0.3 part by mass of n-octadecyl-3-(3',5-di-tert-butyl-4'-hydroxyphenyl)propionate as a stabilizer and 0.05 part by mass of t-dodecylmercaptan as a chain transfer agent were then added, followed by stirring for dissolution. Thereto was added 1,1-bis(tert-butylperoxy)3,3, 5-trimethylcyclohexane in an amount of 60 ppm based on the styrene monomer, which was then polymerized at 105° C. for 3 hours, 120° C. for 2 hours, 150° C. for 2 hours, and 170° C. for 2 hours. The heating was further carried out at 230° C. for 30 minutes, and an unreacted product was then removed under reduced pressure, followed by pulverizing the resultant vinyl aromatic hydrocarbon resin and then making it into pellet form at 180° C. using a 20-mm twin screw extruder. The characteristics of the vinyl aromatic hydrocarbon resins thus obtained are shown in Table 3. These vinyl aromatic hydrocarbon resins were excellent in the balance of impact strength and gloss.

Examples 12 and 13

Vinyl aromatic hydrocarbon resins were obtained in Example 12 by the same method as in Example 1 and in Example 13 by the same method as in Example 3, except for changing the amount of styrene to 67 parts by mass and further adding 23 parts by mass of acrylonitrile (these resins are called "ABS resin"). The characteristics of the vinyl aromatic hydrocarbon resins thus obtained are shown in Table 4. The resultant vinyl aromatic hydrocarbon resins were excellent in the balance of impact strength and gloss.

Example 14

A vinyl aromatic hydrocarbon resin was obtained by the same method as in Example 2 except for changing the amount of styrene to 42 parts by mass and further adding 48 parts by mass of methyl methacrylate (this resin is called "MBS resin"). The characteristics of the vinyl aromatic hydrocarbon resin thus obtained are shown in Table 4. The resultant vinyl aromatic hydrocarbon resin was excellent in the balance of impact strength and gloss.

Comparative Example 1

Using the copolymer l shown in Table 1, a vinyl aromatic hydrocarbon resin was obtained by the same method as in Example 1. The characteristics of the vinyl aromatic hydrocarbon resin thus obtained are shown in Table 4.

The resultant vinyl aromatic hydrocarbon resin was inferior in the balance of impact strength and gloss.

Comparative Example 2

Using the copolymer l shown in Table 1, an ABS resin was obtained by the same method as in Example 12. The characteristics of the ABS resin thus obtained are shown in Table 4.

The resultant ABS resin was inferior in the balance of impact strength and gloss.

Comparative Examples 3 to 5

Using the copolymers i, j, and k shown in Table 1, vinyl aromatic hydrocarbon resins were obtained by the same method as in Example 1. The characteristics of the vinyl aromatic hydrocarbon resin thus obtained are shown in Table 4.

The resultant vinyl aromatic hydrocarbon resins were inferior in the balance of impact strength and gloss.

TABLE 1

| Copolymer | | a | b | c | d | e | f | g | h | i | j | k | l |
|---|---|---|---|---|---|---|---|---|---|---|---|---|---|
| Styrene content | (wt %) | 15 | 35 | 25 | 40 | 25 | 30 | 22.5 | 15 | 25 | 55 | 45 | 15 |
| Polystyrene block content | (wt %) | 14 | 18 | 14 | 30 | 14 | 27 | 20 | 14 | 10 | 35 | 18 | 14 |
| Polystyrene block ratio | (wt %) | 93 | 51 | 56 | 75 | 56 | 90 | 89 | 93 | 40 | 64 | 40 | 93 |
| Vinyl bonding amount | (mol %) | 14 | 18 | 14 | 14 | 12 | 13 | 14 | 14 | 16 | 14 | 16 | 14 |
| Hydrogenation ratio | (%) | — | — | — | — | — | — | — | 20 | — | — | — | — |
| Styrene solution viscosity (25° C., 5 wt %) | mPa·s | 11 | 23 | 30 | 33 | 76 | 31 | 45 | 12 | 30 | 13 | 22 | 12 |
| Mw | ×10$^4$ | 12.9 | 32.3 | 22.3 | 37.3 | 30.6 | 23.5 | 42.3 | 13.2 | 23.6 | 15.3 | 30.2 | 13 |
| Mw/Mn | | 1.09 | 1.08 | 1.34 | 1.08 | 1.94 | 1.35 | 1.33 | 1.1 | 1.33 | 1.09 | 1.09 | 1.02 |
| Modifier species | | M1 | M1 | M2 | M1 | M1 | M3 | M4 | M1 | M2 | M1 | M1 | — |
| Proportion of a modified polymer (wt %) | | 79 | 76 | 85 | 71 | 73 | 76 | 75 | 79 | 83 | 81 | 82 | 0 |

M1: 1,3-dimethyl-2-imidazolidinone
M2: tetraglycidyl-1,3-bisaminomethylcyclohexane
M3: N-(1,3-dimethylbutylidene)-3-(triethoxysilyl)-1-propaneamine
M4: γ-glycidoxypropyltriethoxysilane

TABLE 2

| | Polymer No. | Primary modified block copolymer | Secondary modifier (mol/Li) | Mw (×10$^4$) | Mw/Mn |
|---|---|---|---|---|---|
| Secondary modified block copolymer | Copolymer m | Copolymer a | D1 (1.0) | 13.5 | 1.1 |
| | Copolymer n | Copolymer c | D1 (1.0) | 23.5 | 1.35 |
| | Copolymer o | Copolymer e | D2 (1.0) | 33.2 | 1.96 |

(Note 1)
Secondary modifier:
D1: maleic anhydride,
D2: tetraglycidyl-1,3-bisaminomethylcyclohexane

TABLE 3

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Resin polymerization conditions | Copolymer species | a | b | c | d | e | f | g | h | m | n | o |
| | Copolymer (parts by weight) | 10 | 10 | 10 | 10 | 10 | 10 | 10 | 10 | 10 | 10 | 10 |

TABLE 3-continued

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
|  | Styrene (parts by weight) | 90 | 90 | 90 | 90 | 90 | 90 | 90 | 90 | 90 | 90 | 90 |
|  | Acrylonitrile (parts by weight) | — | — | — | — | — | — | — | — | — | — | — |
|  | Methyl methacrylate (parts by weight) | — | — | — | — | — | — | — | — | — | — | — |
| Resin physical properties | Rubber particle size (μm) | 0.76 | 1.02 | 1.21 | 0.5 | 1.57 | 1.11 | 1.33 | 0.78 | 0.8 | 1.18 | 1.6 |
|  | Izod impact strength (kg-cm/cm) | 11.8 | 12.6 | 13.2 | 9.8 | 14.1 | 13.3 | 14.2 | 12.5 | 12.4 | 13 | 14.5 |
|  | Gloss (%) | 91 | 85 | 82 | 95 | 77 | 84 | 84 | 90 | 91 | 86 | 78 |

TABLE 4

|  |  | Ex. 12 | Ex. 13 | Ex. 14 | Comp. Ex. 1 | Comp. Ex. 2 | Comp. Ex. 3 | Comp. Ex. 4 | Comp. Ex. 5 |
|---|---|---|---|---|---|---|---|---|---|
| Resin polymerization conditions | Copolymer species | a | c | b | l | l | i | j | k |
|  | Copolymer (parts by weight) | 10 | 10 | 10 | 10 | 10 | 10 | 10 | 10 |
|  | Styrene (parts by weight) | 67 | 67 | 42 | 90 | 67 | 90 | 90 | 90 |
|  | Acrylonitrile (parts by weight) | 23 | 23 | — | — | 23 | — | — | — |
|  | Methyl methacrylate (parts by weight) | — | — | 48 | — | — | — | — | — |
| Resin physical properties | Rubber particle size (μm) | 0.6 | 0.74 | 0.88 | 0.8 | 0.61 | 1.1 | 0.45 | 0.9 |
|  | Izod impact strength (kg-cm/cm) | 15.7 | 15.2 | 13.8 | 6.9 | 7.5 | 8.1 | 5.7 | 7.7 |
|  | Gloss (%) | 89 | 86 | 89 | 80 | 85 | 78 | 93 | 80 |

INDUSTRIAL APPLICABILITY

The impact-resistant vinyl aromatic hydrocarbon resin of the present invention can be used in a wide variety of applications, including electronic equipment such as TV and VTR, home electric appliances such as air conditioners and refrigerators, general machinery such as office automation business machines, stationary products, toys, leisure sports goods, household articles, building material and housing parts, and food containers because it is markedly excellent in the property balance of rigidity, impact resistance, and gloss compared to conventional impact-resistant vinyl aromatic hydrocarbon resins.

The invention claimed is:

1. An impact-resistant vinyl aromatic hydrocarbon resin, the hydrocarbon resin being produced by radical polymerization of 75 to 98 parts by mass of a vinyl aromatic hydrocarbon monomer (A-1) or a mixture of a vinyl aromatic hydrocarbon monomer and a monomer copolymerizable therewith (A-2) and 2 to 25 parts by mass of a modified block copolymer (B), wherein
the total amount of the vinyl aromatic hydrocarbon monomer (A-1) or the mixture (A-2) and the modified block copolymer (B) is 100 parts by mass,
the modified block copolymer (B) comprises:
(B-1) a base block copolymer comprising conjugated diene monomer units and vinyl aromatic hydrocarbon monomer units, the base block copolymer containing at least one polymer block of vinyl aromatic hydrocarbon monomer units (H);
(B-2) at least one primary modifier group comprising at least one functional group, bonded to the base block copolymer; and
the modified block copolymer (B) has the following characteristics:
(i) the content of the vinyl aromatic hydrocarbon monomer units is 12 to 50 mass % based on the mass of the modified block copolymer (B);
(ii) the content of the at least one polymer block (H) is 12 to 45 mass % based on the mass of the modified block copolymer (B); and
(iii) the polymer block ratio defined as the mass % of the at least one polymer block of vinyl aromatic hydrocarbon monomer units (H) based on the total mass of vinyl aromatic hydrocarbon monomer units contained in the modified block copolymer (B) is more than 50 mass %.

2. The impact-resistant vinyl aromatic hydrocarbon resin according to claim 1, characterized in that the mixture (A-2) is a mixture of a vinyl aromatic hydrocarbon monomer and an unsaturated nitrile monomer.

3. The impact-resistant vinyl aromatic hydrocarbon resin according to claim 1 or 2, characterized in that the primary modifier group comprises at least one functional group selected from the group consisting of a hydroxyl group, an epoxy group, an amino group, a silanol group, and an alkoxysilane group containing 1 to 24 carbon atoms.

4. The impact-resistant vinyl aromatic hydrocarbon resin according to claim 1 or 2, characterized in that the or each primary modifier group comprises at least one functional group selected from the group consisting of functional groups represented by formulas (a) to (m) below:

[Formula 5]

$$—NR^1—R^5—OH, \quad (a)$$

$$—N[R^5—OH]_2, \quad (b)$$

$$—NR^1—R^5—Si(OR^6)_3, \quad (c)$$

-continued

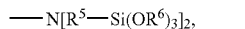 (d)

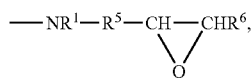 (e)

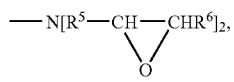 (f)

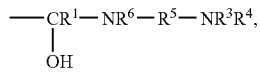 (g)

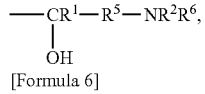 (h)

[Formula 6]

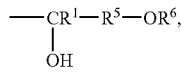 (i)

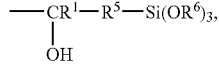 (j)

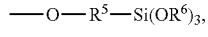 (k)

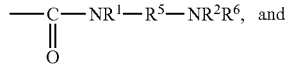 (l)

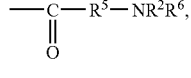 (m)

in the above formulas (a) to (m),

N represents a nitrogen atom, Si represents a silicon atom, O represents an oxygen atom, C represents a carbon atom, and H represents a hydrogen atom;

$R^1$ to $R^4$ each independently represent a hydrogen atom and a monovalent hydrocarbon group containing 1 to 24 carbon atoms, wherein the monovalent hydrocarbon group is unsubstituted or substituted by at least one functional group each independently selected from the group consisting of a hydroxyl group, an epoxy group, an amino group, a silanol group, and an alkoxysilane group containing 1 to 24 carbon atoms;

$R^5$s each independently represent a divalent hydrocarbon group containing 1 to 48 carbon atoms, wherein the divalent hydrocarbon group is unsubstituted or substituted by at least one functional group each independently selected from the group consisting of a hydroxyl group, an epoxy group, an amino group, a silanol group, and an alkoxysilane group containing 1 to 24 carbon atoms;

$R^6$s each independently represent a hydrogen atom or an alkyl group containing 1 to 8 carbon atoms;

wherein $R^1$ to $R^5$ may optionally each independently have at least one atom selected from the group consisting of an oxygen atom, a nitrogen atom, and a silicon atom, bonded in a bonding mode other than those for a hydroxyl group, an epoxy group, an amino group, a silanol group, and alkoxysilane groups.

5. The impact-resistant vinyl aromatic hydrocarbon resin according to claim 1 or 2, characterized in that the modified block copolymer (B) further comprises at least one secondary modifier group, wherein the secondary modifier group comprises at least one functional group bonded to the functional group of the primary modifier group.

6. The impact-resistant vinyl aromatic hydrocarbon resin according to claim 5, characterized in that the or each secondary modifier group comprises at least one functional group selected from the group consisting of a hydroxyl group, an amino group, a carboxyl group, an acid anhydride group, an isocyanate group, an epoxy group, a silanol group, and an alkoxysilane group containing 1 to 24 carbon atoms.

7. The impact-resistant vinyl aromatic hydrocarbon resin according to claim 1 or 2, characterized in that 70% or less of the double bonds of the conjugated diene monomer units in the base block copolymer (B-1) is hydrogenated.

* * * * *